United States Patent
Schliwa-Bertling et al.

(10) Patent No.: US 9,596,630 B2
(45) Date of Patent: Mar. 14, 2017

(54) SOURCE BASED SELECTION OF SERVING OPERATOR

(71) Applicant: Telefonaktiebolaget L M Ericsson, Stockholm (SE)

(72) Inventors: Paul Schliwa-Bertling, Ljungsbro (SE); Bo Ehrenholm, Linköping (SE); Roland Gustafsson, Bengtsfors (SE); Josefin Karlsson, Torslanda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 14/437,124

(22) PCT Filed: Nov. 4, 2013

(86) PCT No.: PCT/EP2013/072934
§ 371 (c)(1),
(2) Date: Apr. 20, 2015

(87) PCT Pub. No.: WO2014/072252
PCT Pub. Date: May 15, 2014

(65) Prior Publication Data
US 2015/0257052 A1    Sep. 10, 2015

Related U.S. Application Data

(60) Provisional application No. 61/722,813, filed on Nov. 6, 2012.

(51) Int. Cl.
*H04W 36/00* (2009.01)
*H04W 36/14* (2009.01)
(Continued)

(52) U.S. Cl.
CPC ....... *H04W 36/0066* (2013.01); *H04W 36/14* (2013.01); *H04W 60/04* (2013.01); *H04W 88/10* (2013.01)

(58) Field of Classification Search
CPC ......... H04W 36/0022; H04W 36/0066; H04W 36/0061; H04W 36/14; H04W 60/04; H04W 88/10; H04W 48/17; H04W 28/10
(Continued)

(56) References Cited

U.S. PATENT DOCUMENTS

2006/0073831 A1*  4/2006  Guyot ................... H04W 36/14
                                                              455/443

FOREIGN PATENT DOCUMENTS

WO    2011079802 A1    7/2011

OTHER PUBLICATIONS

International Search Report and Written Opinion dated Mar. 25, 2014 for International Application Serial No. PCT/EP2013/072934, International Filing Date—Nov. 4, 2013 consisting of 10-pages.
(Continued)

*Primary Examiner* — Phuoc H Doan
(74) *Attorney, Agent, or Firm* — Christopher & Weisberg, P.A.

(57) ABSTRACT

The embodiments herein relate to a method in a target RAN node for enabling source based selection of a serving operator which should serve a wireless device in a target shared network. During handover, the target RAN node receives the serving operator that should serve the wireless device in the target shared network. After the handover, the target RAN node transmits a request for the IMSI and receives a response with the IMSI. The target RAN node obtains information about the serving operator stored during the handover. The target RAN node determines a target CN node served by the serving operator if the target shared network is a MOCN network. The target RAN node transmits information indicating the serving operator to the target CN node if the target shared network is a GWCN network.

22 Claims, 13 Drawing Sheets

(51) Int. Cl.
*H04W 60/04* (2009.01)
*H04W 88/10* (2009.01)

(58) Field of Classification Search
USPC ............ 455/443, 436, 422.1; 370/331, 332; 380/270
See application file for complete search history.

(56) References Cited

OTHER PUBLICATIONS

3rd Generation Partnership Project; Technical Specification Group Services and System Aspects; Network Sharing; Architecture and Functional Description (Release 11), 3GPP Standard; 3GPP TS 23.251, V11.0.0, pp. 1-28, 3rd Generation Partnership Project (3GPP), Mobile Competence Centre; 650, Route Des Lucioles; F-06921 Sophia-Antipolis; France, Aug. 24, 2011 (Aug. 24, 2011), XP050553743, consisting of 28-pages.

* cited by examiner

US 9,596,630 B2

SOURCE BASED SELECTION OF SERVING OPERATOR

TECHNICAL FIELD

Embodiments herein relate generally to a target Radio Access Network (RAN) node, a method in the target RAN node, a target Core Network, CN, node and a method in the target CN node. More particularly the embodiments herein relate to source based selection of a Public Land Mobile Network (PLMN)/serving operator which should serve a wireless device in a target shared network.

BACKGROUND

In a typical communications network, also referred to as e.g. a wireless communications network, a wireless communications system, a communications network or a communications system, a wireless device communicates via a RAN to one or more CNs.

The wireless device may be a device by which a subscriber may access services offered by an operator's network and services outside the operator's network to which the operator's RAN and CN provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the RAN, with another entity, such as another device or a server.

Wireless devices are enabled to communicate wirelessly in the communications network. The communication may be performed e.g. between two wireless devices, between a wireless device and a regular telephone and/or between the devices and a server via the RAN and possibly one or more CNs and possibly the Internet.

The communications network may be described as a geographical area which is divided into cell areas, with each cell area being served by a base station, e.g. a Radio Base Station (RBS), which in some RANs is also called evolved NodeB (eNB), NodeB, B node or base station. A cell is a geographical area where radio coverage is provided by the radio base station at a base station site. The base station communicates with the wireless device(s) within range of the base station.

The Third Generation Partnership Project (3GPP) network may be organized using network sharing. A shared network allows different CN operators to connect to a shared RAN. The operators may share radio network elements and/or radio resources, in addition to the CN nodes. The target shared network is shared between CN operators. To handle network sharing, the 3GPP standard has introduced support for Multi Operator Core Network (MOCN) and Gateway Core Network (GWCN) (see 3GPP TS 23.251) which provides means to share RANs between multiple operators. In GWCN, the CN operators also share CN nodes, such as a Mobile Switching Center (MSC) or Serving General packet radio service Support Node (SGSN), in addition to sharing RAN nodes. In MOCN, only the RAN is shared between the CN operators. The RAN is responsible for the selection of the CN node when the wireless device performs registration procedures like e.g. Location Area Update (LAU), Routing Area Update (RAU) or combined RAU/LAU. In the Release-10 of the 3GPP specification, new procedures have been introduced to re-route a registration to another CN node if the initial selection performed by the RAN was incorrect (see 3GPP TS 23.251).

A routing area is the PS domain corresponding item to a location area. A routing area may be a subdivision of a location area and there may be at least one routing area within the corresponding location area. A routing area is identified by a Routing Area Identifier (RAI) and a location area is identified by a Location Area Identifier (LAI). A PLMN may be divided into location areas and routing areas. A change from routing area to routing area, referred to as a routing area update, is done in a very similar way to a change from location area to location area. The main difference is that the SGSN is the involved node.

When the wireless device is moving, it may be handed over from a source network to a target shared network, e.g. from a source RAN node to a target RAN node. At handover, the connections between the wireless device and the source network are handed over to the target shared network. After a handover, a target shared network selects the PLMN that the wireless device shall register to. PLMN is a network with the objective of providing wireless communication and to interlink the wireless network with the fixed wired network. A PLMN is identified by a PLMN ID comprising a Mobile Country Code (MCC) and a Mobile Network Code (MNC). Each operator providing mobile services may have its own PLMN. PLMNs interconnect with other PLMNs and Public Switched Telephone Networks (PSTNs) for telephone communications or with internet service providers for data and internet access of which links are defined as interconnect links between providers.

SUMMARY

An objective of embodiments herein is therefore to provide an improved communications network.

According to a first aspect, the object is achieved by a method in a target RAN node for enabling source based selection of a serving operator which should serve a wireless device in a target shared network. During handover of the wireless device from a source network to the target shared network, the target RAN node receives, from a source RAN node, information indicating the serving operator that should serve the wireless device in the target shared network. The serving operator is selected by the source RAN node. The information is a PLMN and an International Mobile Subscriber Identity (IMSI) associated with the wireless device. During the handover, the target RAN node stores the information indicating the serving operator. After the handover, the target RAN node transmits a request for the IMSI to a target CN node. After the handover, the target RAN node receives a response with information indicating the IMSI from the target CN node and obtains information about the serving operator stored during the handover. The information is obtained using the IMSI received after the handover. After the handover, the target RAN node determines a target CN node served by the serving operator if the target shared network is a MOCN network. After the handover, the target RAN node transmits information indicating the serving operator to the target CN node if the target shared network is a GWCN network. The serving operator was selected by the source RAN node during the handover.

According to a second aspect, the object is achieved by a method in a target CN node for enabling source based selection of a serving operator which should serve a wireless device in a target shared network. After handover of the wireless device from a source network to the target shared network, the target CN node receives a request for an IMSI from the target RAN node and transmits a response with information indicating the IMSI to the target RAN node.

According to a third aspect, the object is achieved by a target RAN node for enabling source based selection of the serving operator which should serve the wireless device in the target shared network. The target RAN node 105t comprises a receiver which is adapted to, during handover of the wireless device from a source network to the target shared network, receive, from the source RAN node, information indicating the serving operator that should serve the wireless device in the target shared network. The serving operator is selected by the source RAN node. The information is a PLMN and an IMSI associated with the wireless device. The target RAN node comprises a processor which is adapted to, during the handover, store the information indicating the serving operator. The target RAN node comprises a transmitter adapted to, after the handover, transmit a request for the IMSI to a target CN node. The receiver is further adapted to, after the handover, receive a response with information indicating the IMSI from the target CN node. The processor is further adapted to, after the handover, obtain information about the serving operator stored during the handover. The information is obtained using the IMSI received after the handover. The processor is adapted to, after the handover, determine a target CN node served by the serving operator if the target shared network is a MOCN. The transmitter is further adapted to, after the handover, transmit information indicating the serving operator to the target CN node if the target shared network is a GWCN. The serving operator was selected by the source RAN node during the handover.

According to a fourth aspect, the object is achieved by a target CN node for enabling source based selection of the serving operator which should serve the wireless device in the target shared network. The target CN node 110t comprises a receiver which is adapted to, after handover of the wireless device from the source network to the target shared network, receive a request for the IMSI from the target RAN node. The target CN node comprises a transmitter which is adapted to, after the handover, transmit a response with information indicating the IMSI to the target RAN node.

Embodiments herein afford many advantages, of which a non-exhaustive list of examples follows:

An advantage of the embodiments herein is that they enable the possibility to support a source based PLMN selection for MOCN and GWCN.

Another advantage is that CS/PS coordination can be achieved at the target shared network.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 3b is a continuation of FIG. 3a.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to enabling source RAN based PLMN selection for MOCN or GWCN at a handover into shared GSM EDGE Radio Access Network (GERAN) or Universal Terrestrial Radio Access Network (UTRAN) for wireless devices that do not support shared networks. The prior to the handover procedure, selection of PLMN made by the source side is considered by the target side. It means that the selection made by the source network will be kept. GSM is short for Global System for Mobile Communications and EDGE is short for Enhanced Data rates for GSM Evolution.

The source side RAN, GERAN, UTRAN or Evolved-UTRAN (E-UTRAN), provides the selected PLMN/serving operator during the handover preparation phase to the target RAN, e.g. GERAN or UTRAN. The target RAN stores the serving operator using e.g. the IMSI as a key to the serving operator and keeps the serving operator even after the wireless device has moved to idle state. When the wireless device performs a non-periodic registration after the handover is completed, the target RAN fetches the IMSI from a core network node (e.g. an MSC or an SGSN) and uses the IMSI to access the previously stored serving operator. Finally, the target RAN uses the serving operator to direct the registration to a PLMN based on the PLMN selected by the source RAN.

Figure 1:
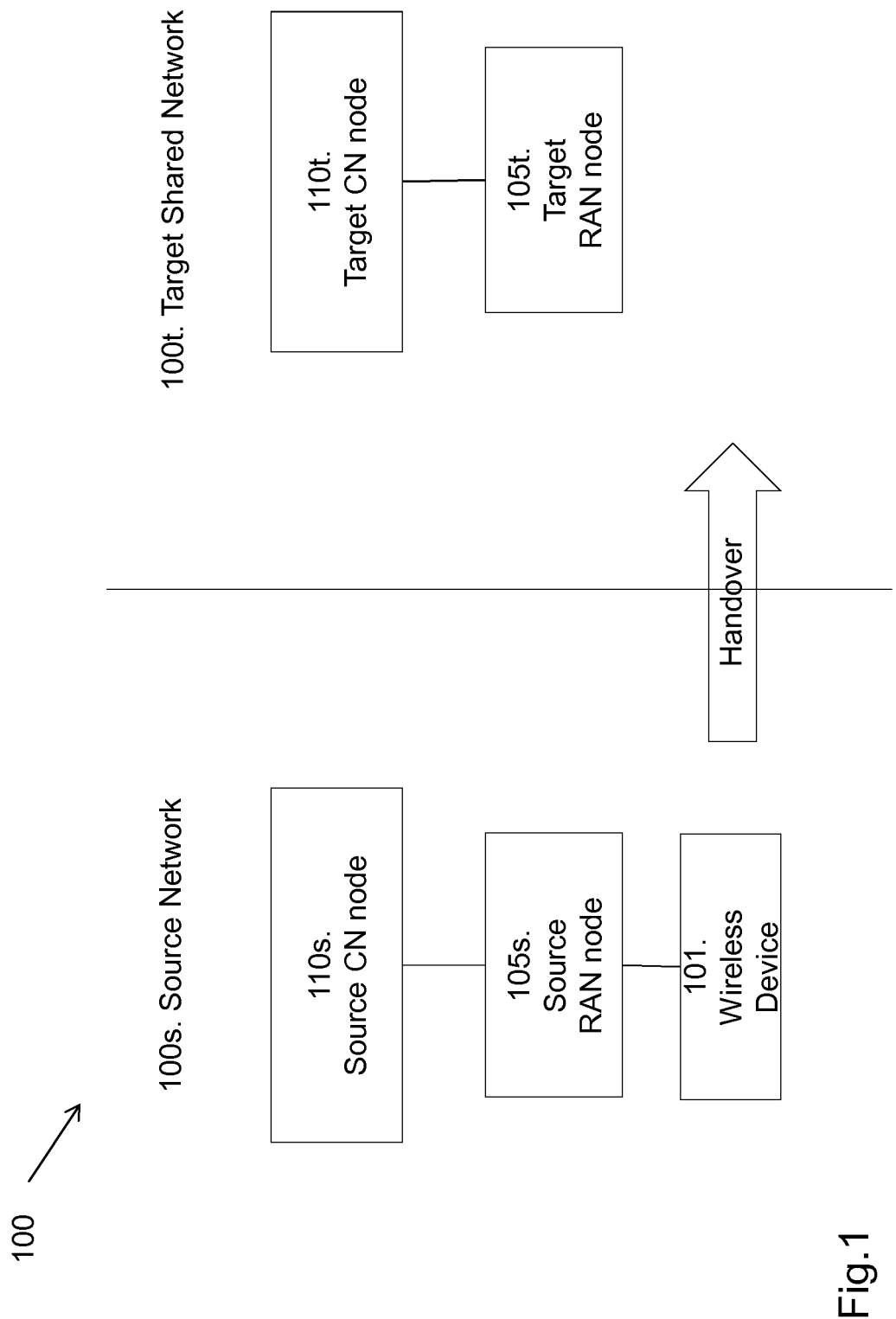
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example GERAN, UTRAN, Long Term Evolution (LTE), LTE Advanced, Wideband Code Division Multiple Access (WCDMA), GSM, or any other 3GPP radio access technology, or other radio access technologies such as Wireless Local Area Network (WLAN).

The communications network 100 comprises a source network 100s from which a wireless device 101 moves to a target shared network 100t. The source network 100s may be a GERAN or an UTRAN or an E-UTRAN. The target shared network 100t may be a GERAN or a UTRAN. The target shared network 100t may be a GWCN or a MOCN. GERAN and UTRAN may have a CS domain and/or a PS domain. E-UTRAN has only a PS domain. These alternatives are illustrated in the following table 1:

TABLE 1

| Source network 100s | Target shared network 100t | |
|---|---|---|
| GERAN | UTRAN | MOCN GWCN |
| GERAN | GERAN | MOCN GWCN |
| UTRAN | UTRAN | MOCN GWCN |
| UTRAN | GERAN | MOCN GWCN |
| E-UTRAN | UTRAN | MOCN GWCN |
| E-UTRAN | GERAN | MOCN GWCN |

The source network 100s comprises a source RAN node 105s serving the wireless device 101 when it is in the source network 100s. The source RAN node 105s may be a source eNB, source NodeB, source base station, source Base Station Controller (BSC), source Radio Network Controller (RNC) etc. The source RAN node 105s is connected to a source CN node 110s. The source CN node 110s may be a source SGSN or a source MSC for a GERAN or UTRAN network. The source CN node 110s is located in a core network, which comprises a CS and/or a PS domain for a GERAN and a UTRAN network and which comprises a PS domain for an E-UTRAN network. For a source CN node 110s in E-UTRAN the source CN node 110s is an MME which is in the PS domain. Some alternative embodiments of the source RAN node 105s, the source CN node 110s and the source network 100s may be as exemplified in the table below:

TABLE 2

| Source network 100s | Source RAN node 105s | Source CN node 110s |
|---|---|---|
| GERAN | BSC | MSC |
| UTRAN | RNC | SGSN |
| E-UTRAN | eNB | MME |

When the wireless device 101 has been handed over to the target shared network 100t, it is served by a target RAN node 105t. The target RAN node 105t may be a target NodeB, target base station, target BSC, target RNC etc. The target RAN node 105t is connected to a target CN node 110t which provides services to the wireless device 101. The target CN node 110t may be a target SGSN or target MSC. The target CN node 110t is located in a core network, which comprises a CS and/or PS domain for a GERAN and an UTRAN network. Some alternative embodiments of the target RAN node 105t, the target CN node 110t and the target shared network 100t may be as exemplified in the table below:

TABLE 3

| Target shared network 100t | Target RAN node 105t | Target CN node 110t |
|---|---|---|
| GERAN | BSC | MSC |
| UTRAN | RNC | SGSN |

Some alternatives embodiments for the nodes in both the source network 100s and the target shared network 100t are illustrated in the table below:

TABLE 4

| Source RAN node 105s | Source CN node 110s | Target CN node 110t | Target RAN node 105t |
|---|---|---|---|
| BSC | MSC | MSC | BSC or RNC |
| BSC | SGSN | SGSN | BSC or RNC |
| RNC | MSC | MSC | BSC or RNC |
| RNC | SGSN | SGSN | BSC or RNC |
| eNB | MME | MSC | BSC or RNC |
| eNB | MME | SGSN | BSC or RNC |

The wireless device 101 may be a device by which a subscriber may access services offered by an operator's network and services outside the operator's network to which the operator's RAN and CN provide access, e.g. access to the Internet. The wireless device 101 may be any device, mobile or stationary, enabled to communicate over a radio channel in the communications network 100, for instance but not limited to e.g. user equipment, mobile phone, smart phone, sensors, meters, vehicles, household appliances, medical appliances, media players, cameras, M2M device or any type of consumer electronic, for instance but not limited to television, radio, lighting arrangements, tablet computer, laptop or PC. The wireless device 101 may be portable, pocket storable, hand held, computer comprised, or vehicle mounted devices, enabled to communicate voice and/or data, via the RAN, with another entity, such as another device or a server.

There are two operational modes of the wireless device 101: idle mode and connected mode. In idle mode, after the wireless device 101 has been switched on, it selects a PLMN to connect to. The wireless device 101 searches for a cell of the selected PLMN that can provide available services and camps on the selected cell. In idle mode, the wireless device 101 is identified by parameters such as the IMSI, a Temporary Mobile Subscriber Identity (TMSI) and a Packet Temporary Mobile Subscriber Identity (P-TMSI). The RAN does not have any information about idle devices, i.e. information such as location, bearer information etc. The wireless device 101 stays in idle mode until it transmits a request to establish a radio connection. In connected mode, the wireless device 101 transmits and receives data. The wireless device 101 leaves the connected mode and returns to idle mode when the radio connection is released or at radio connection failure. In connected mode, the RAN has information about the connected devices, i.e. information such as location and bearer information etc.

The method for source based PLMN selection, according to some embodiments will now be described with reference to the signaling diagram depicted in FIG. 2. As mentioned previously, the target shared network 100t may be for example a GERAN or a UTRAN and the source network 100s may be a GERAN or UTRAN or E-UTRAN. The method comprises the following steps, which steps may be performed in any suitable order than described below:

Step 201

The source RAN node 105s selects the serving operator that should serve the wireless device 101 in the target shared network 100t. The serving operator may also be referred to as target PLMN. The source RAN node 105s may be based on GERAN, UTRAN or E-UTRAN.

Step 202a

The information indicating the selected serving operator is included in the handover preparation phase e.g. as a part of the target cell identifier or as a new information element in the relevant messages which are HANDOVER REQUIRED (see 3GPP TS 48.008) and PS HANDOVER REQUIRED (see 3GPP TS 48.018) or HANDOVER REQUIRED (see 3GPP TS 36.413) or RELOCATION REQUIRED (see 3GPP TS 25.413). The HANDOVER REQUIRED or RELOCATION REQUIRED is sent from the source RAN node 105s to the source CN node 110s to indicate that for a given wireless device 101 which already has dedicated radio resource(s) assigned, a handover is required for the reason given by a cause element. If the handover is a CS handover, the source CN node 110s that receives the information indicating the selected serving operator is an MSC. If the handover is a PS handover, the source CN node 110s that receives the information indicating the selected serving operator is an SGSN or an MME. The HANDOVER REQUIRED and PS HANDOVER REQUIRED are used in an E-UTRAN network. The HANDOVER REQUIRED and RELOCATION REQUIRED are used in an UTRAN network.

Step 202b, 202c

The information about the selected serving operator is sent from the source CN node 110s via the target CN node 110t to the target RAN node 105t in the relevant messages which are HANDOVER REQUEST (see 3GPP TS 48.008) and PS HANDOVER REQUEST (see 3GPP TS 48.018) or RELOCATION REQUEST (see 3GPP TS 25.413) either as a part of the target cell identifier or a new information element. This message is sent from the target CN node 110t to the target RAN node 105t to indicate that the wireless device 101 is to be handed over to that target RAN node 105t. The HANDOVER REQUEST is a message sent from the MSC to the Base Station Subsystem (BSS) to indicate that the wireless device 101 is to be handed over to that BSS. PS HANDOVER REQUEST or RELOCATION REQUEST is initiated by the SGSN by sending the PS HANDOVER REQUEST or RELOCATION REQUEST to the target RAN node 105t. If the handover is a CS handover, the target CN node 110t that receives the information indicating the selected serving operator is an MSC. If the handover is a PS handover, the target CN node 110t that receives the information indicating the selected serving operator is an SGSN or a MME.

The messages HANDOVER REQUEST and PS HANDOVER REQUEST and RELOCATION REQUEST are used between the target CN node 110t and the target RAN node 105t, i.e. step 202c.

Step 203

The target RAN node 105t stores the selected serving operator and the IMSI associated with the wireless device 101 to be handed over to the target shared network 100t. The information indicating the serving operator is received from the source RAN node 105s during or after the handover procedure, as the key to the serving operator.

Figure 2:
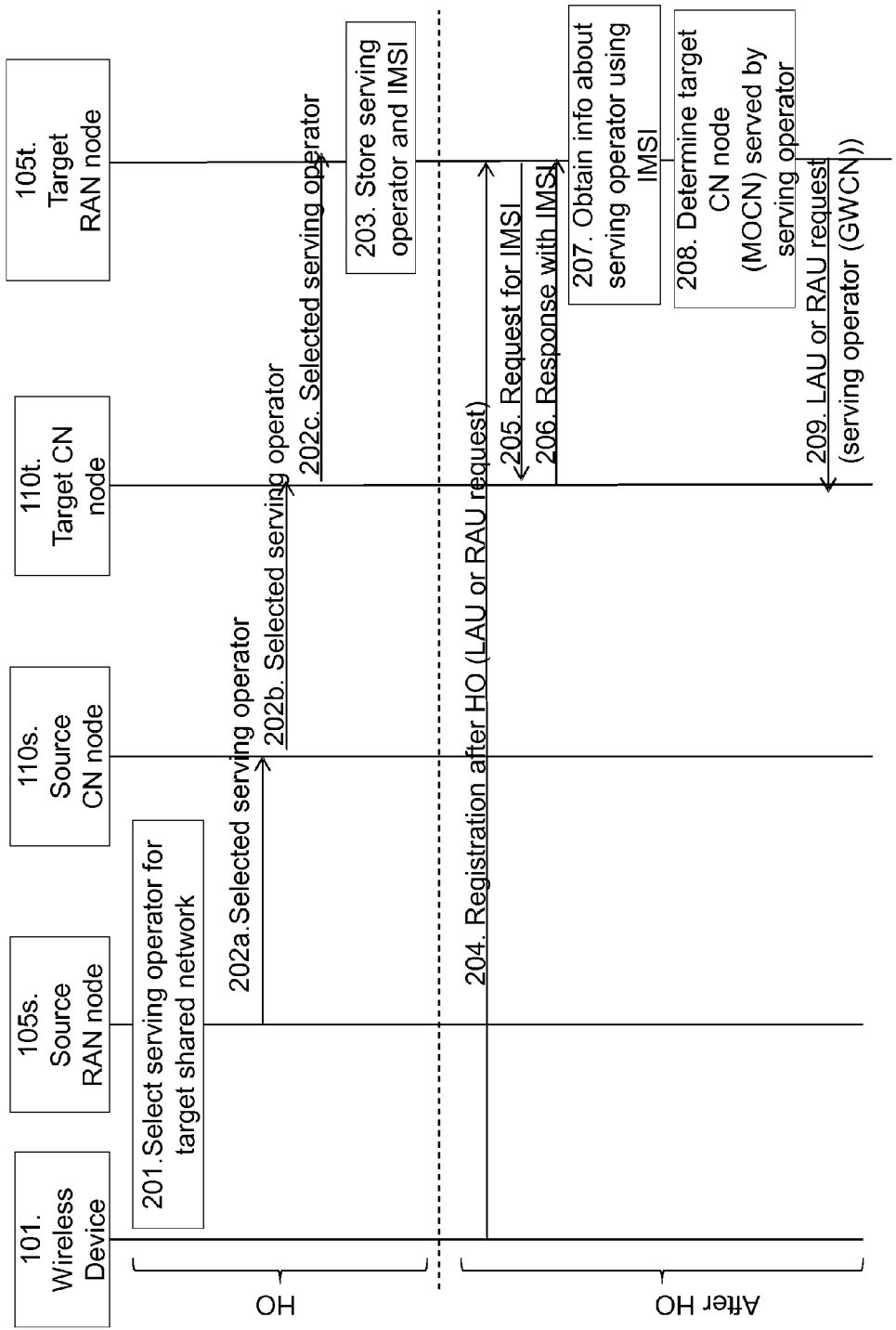
FIG. 2 is a signaling diagram illustrating embodiments of a method.

The dotted line in FIG. 2 illustrates the end of the handover procedure. Steps 204-209 are steps performed after the handover procedure, i.e. when the wireless device 101 has returned to idle mode.

Step 204

The wireless device 101 performs a non-periodic registration after the handover and the possible following transaction in connected mode, i.e. when the wireless device 101 has returned to the idle mode. This may involve transmitting a LAU comprising a TIMSI for the CS domain, i.e. when the target CN node 110t is a MSC, or transmitting a RAU comprising a P-TMSI of the PS domain, i.e. when the target CN node 110t is a SGSN or a MME.

Step 205

The target RAN node 105t transmits a request to the target CN node 110t (MSC or SGSN) to provide the IMSI. The request comprises the TMSI or P-TMSI that it received from the wireless device 101 in step 204.

Step 206

The target CN node 110t transmits a response message to the target RAN node 105t with the IMSI.

Step 207

The serving target RAN node 105t uses the IMSI provided by the target CN node 110t to access the information about the serving operator.

Step 208

The serving target RAN node 105t determines which target CN node 110t (in case the target shared network 100t is a MOCN) that is served by the serving operator or include information indicating the serving operator to the target CN node 110t (in case the target shared network 100t is a GWCN).

Step 209

The serving target RAN node 105*t* directs the registration procedure, LOCATION UPDATE REQUEST or ROUTING AREA UPDATE REQUEST message to the target CN node 110*t* that is served by the serving operator, e.g. the selected PLMN (in the MOCN case). Additionally it includes the serving operator in this message the information about the selected serving operator (needed for the GWCN case). The LOCATION UPDATE REQUEST is transmitted when the wireless device 101 finds that its location area code is different from its last update. The LOCATION UPDATE REQUEST comprises information indicating its previous location and its TMSI. The target CN node 110*t* that is served by the serving operator may be the target CN node 110*t* as shown in FIG. 2, but it may also be another target CN node that is not shown in FIG. 2 but which is the one that serves the serving operator. In FIG. 2, the target CN node 110*t* is used as an example of the target CN node that is served by the serving operator and that should receive the LAU or RAU from the target RAN node 105*t*.

A location area, as mentioned above, comprises one or more radio cells and is identified with a unique number referred to as location area code. A routing area is the PS domain equivalent of a location area. A routing area may be a subdivision of a location area. A change from routing area to routing area, referred to as a RAU is done in a very similar way to a change from location area to location area. The main difference is that the SGSN is the involved node in a RAU procedure.

Figure 3A:
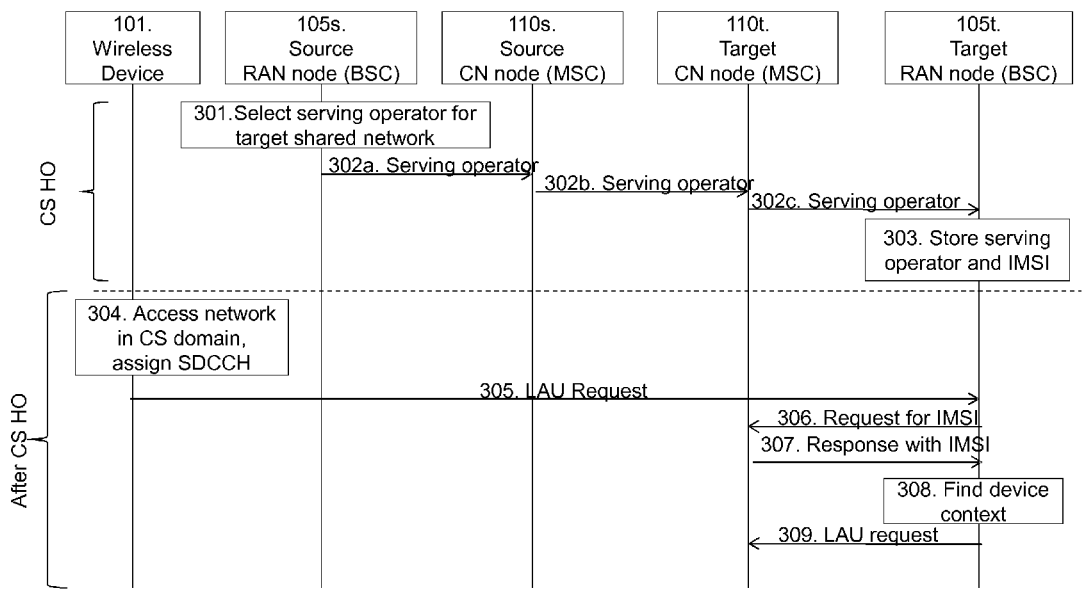
FIG. 3a is a signaling diagram illustrating embodiments of Circuit Switched (CS) handover without Dual Transfer Mode (DTM).
Figure 3B:
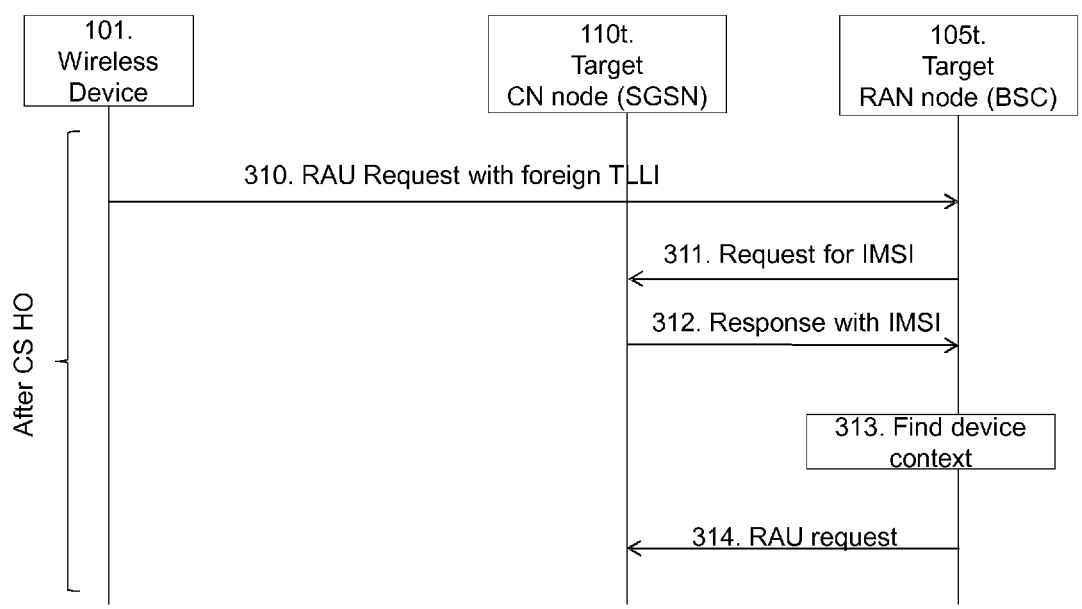
Figure 4:
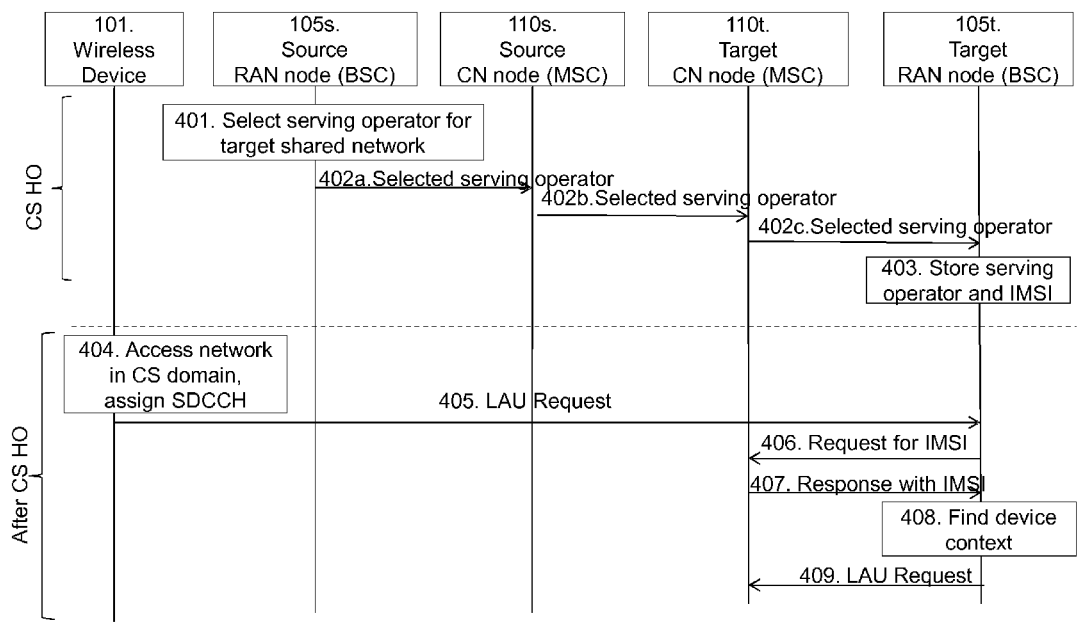
FIG. 4 is a signaling diagram illustrating embodiments of CS handover with DTM.
Figure 5:
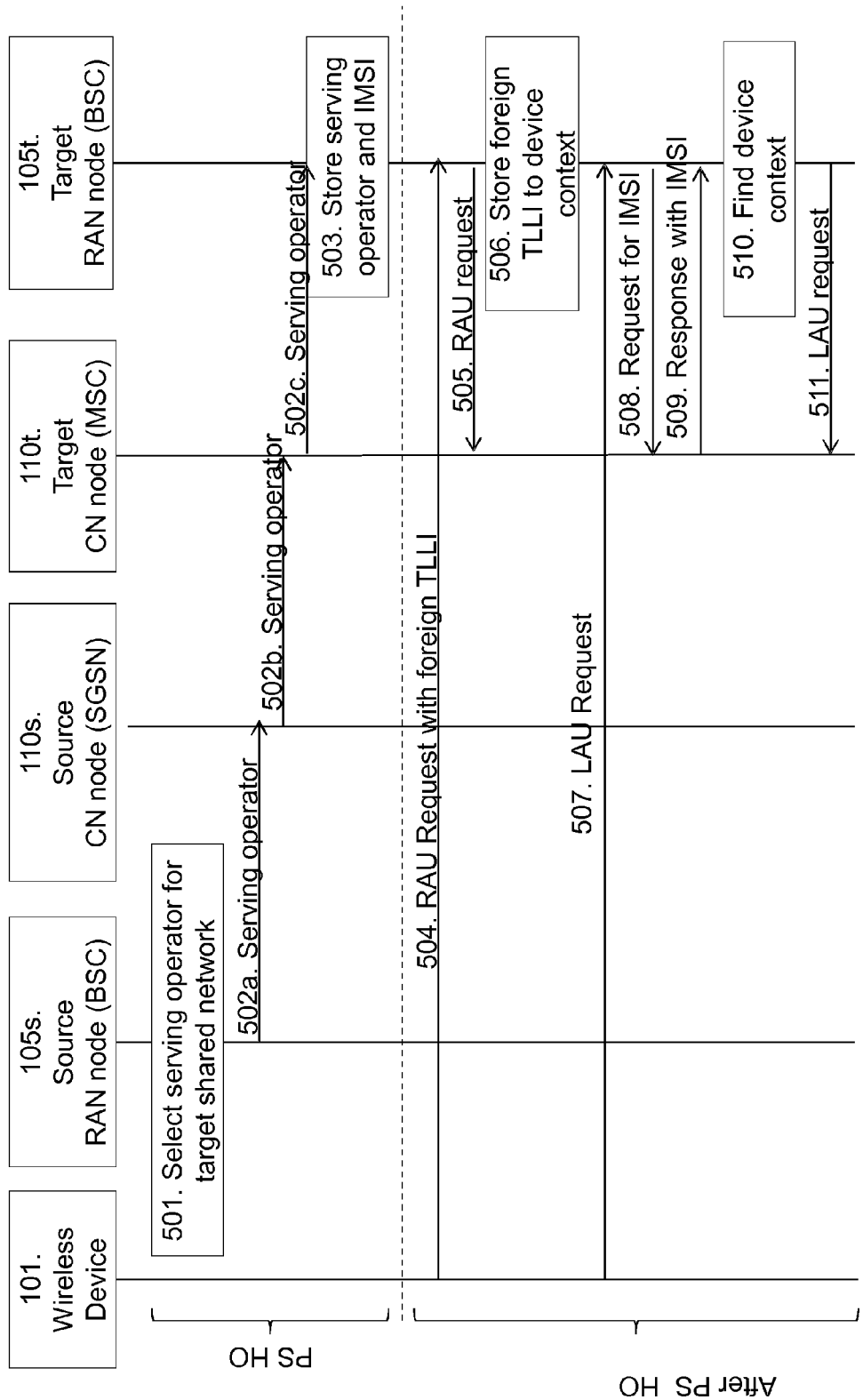
FIG. 5 is a signaling diagram illustrating embodiments of Packet Switched (PS) handover.

In the following, some example embodiments will be described. FIGS. 3*a* and 3*b* illustrate a CS handover without DTM, FIG. 4 illustrates a CS handover with DTM and FIG. 5 illustrates a PS handover.

CS Handover without DTM

The method for source based PLMN selection, according to some embodiments will now be described with reference to the signaling diagram depicted in FIGS. 3*a-b*. FIG. 3*a* illustrates the LAU procedure and comprises steps 301-309. FIG. 3*b* illustrates the RAU procedure and comprises steps 310-314. It is assumed that DTM is not supported. DTM is a protocol that makes it possible for the wireless device 101 to simultaneous transfer CS voice and PS data. It is also assumed that there is no support for a Gs interface between the target CN node 110*t* and the target RAN node 105*t* in an embodiment where the target CN node 110*t* is a SGSN and target RAN node 105 is a MSC, and for a combined LAU/RAU procedure.

Note that the use cases in general are not limited to not use Gs interface or combined LAU/RAU procedure. The wireless device 101 is registered in the CS and the PS domain. The wireless device 101 is in dedicated mode and is subject to a handover into a shared GERAN cell. In this example embodiment seen in FIGS. 3*a-b*, the target shared network 100*t* is a GERAN, the source RAN node 105*s* is a source BSC, the target RAN node 105*t* is a target BSC. The source CN node 110*t* is a source MSC and the target CN node 110*t* is first a target MSC (for CS) and then a target SGSN (for PS).

The method comprises the following steps, which steps may as well be carried out in another suitable order than described below.

Step 301

This step is seen in FIG. 3*a*. This step corresponds to step 201 in FIG. 2. The source BSC 105*s* selects the target serving operator, e.g. its PLMN, for the target BSC 105*t* in the target shared GERAN network 100*t* and includes information indicating the serving operator in the handover preparation phase, e.g. in the HANDOVER REQUIRED message in the target cell identifier.

Step 302*a, b, c*

This step is seen in FIG. 3*a*. This step corresponds to steps 202*a*, 202*b*, and 202*c* in FIG. 2. The target BSC 105*t* receives information indicating the selected target PLMN in the handover preparation phase, e.g. in the HANDOVER REQUEST message in the target cell identifier. The target BSC 105*t* receives this information from the source BSC 105*s* (step 302*a*) via the source MSC 110*s* (step 302*b*) and the target MSC 110*t* (step 302*c*).

Step 303

This step is seen in FIG. 3*a*. This step corresponds to step 203 in FIG. 2. Triggered by the reception of the serving operator, the target BSC 105*t* stores the information indicating the serving operator and the IMSI in the device context, e.g. the MS context.

An ongoing CS call is terminated and the wireless device 101 moves into idle mode. This is illustrated by the horizontal dotted line in FIG. 3*a*.

Step 304

This step is seen in FIG. 3*a*. After the CS call is terminated and the wireless device 101 has moved into idle mode, the wireless device 101 accesses the network in the CS domain which results in assignment of a Standalone Dedicated Control Channel (SDCCH) (see 3GPP TS 44.018). SDCCH is used to provide a reliable connection for e.g. signaling and SMS.

Step 305

This step is seen in FIG. 3*a*. After the CS call is terminated and the wireless device 101 has moved into idle mode, the wireless device 101 acquires system information in the new cell. When it detects that the location area of the serving new cell is different from its registered location area, it will trigger the LAU procedure (see 3GPP TS 24.008). The wireless device 101 starts the LAU procedure by sending a LAU request to the target BSC 105*t*.

Given that DTM is not used, the wireless device 101 suspends the PS service (see 3GPP TS 44.018) whereby it may provide its foreign Temporary Logical Link Identifier (TLLI) to the target BSC 105*t* in the 3GPP TS 44.018 GPRS SUSPEND REQUEST message on the SDCCH (CS domain). TLLI provides the signaling address used for communication between the wireless device 101 and the SGSN. The TLLI address is divided into four ranges: Local, Foreign, Random, and Auxiliary. The local TLLI is derived from the PTMSI allocated by the SGSN, and is valid only in the Routing Area associated with the PTMSI. The foreign TLLI is derived from a PTMSI allocated in another routing area and is primarily used when crossing a routing area boundary. The random TLLI is selected randomly by the wireless device 101, and is used when the device does not have a valid PTMSI available. The auxiliary TLLI is selected by the SGSN.

Step 306

This step is seen in FIG. 3a. This step corresponds to step 205 in FIG. 2. Based on the above and the fact that the LAU request message is related to a non-periodic LAU procedure received by the target BSC 105t, the target BSC 105t shall request the IMSI from the target MSC 110t. The target BSC 105t provides information indicating the TMSI in the request for IMSI.

Step 307

This step is seen in FIG. 3a. This step corresponds to step 206 in FIG. 2. The target MSC 110t uses the TMSI to find the associated IMSI. The target MSC 110t replies back to the target BSC 105t with the IMSI value.

Step 308

This step is seen in FIG. 3a. This step corresponds to steps 207 and 208 in FIG. 2. The target BSC 105t uses the IMSI which it received in step 307 to find the device context, e.g. the MS Context. The target BSC 105t may further store a foreign TLLI in the device context. The device context comprises information indicating the target CN node served by the serving operator which was stored in step 303.

Step 309

This step is seen in FIG. 3a. This step corresponds to step 209 in FIG. 2. The target BSC 105t forwards the LAU Request (which the target BSC 105t received in step 305 from the wireless device 101) to the target CN node 110t served by the serving operator, e.g. target PLMN, stored as selected serving operator in the device context, e.g. MS context. The target BSC 105t may include information indicating the selected serving operator in the message.

After a successful completion of the LAU procedure, the network releases the CS connection. Given that a changed LA consequently implies a change of the RA (see 3GPP TS 22.003), the wireless device 101 will now initiate a PS connection to perform RAU procedure.

The RAU is performed as follows, which is seen in steps 310-314 FIG. 3b. In FIG. 3b, only the nodes in the target shared network 100t is shown since the nodes in the source network 100s is not involved in the RAU procedure. In steps 310-314 for the PS connection, the target CN node 110t is a SGSN and not a MSC as in the LAU procedure. The target RAN node 105 is still a BSC.

Step 310

This step is seen in FIG. 3b. This step corresponds to step 204 in FIG. 2. The wireless device 101 transmits to the target BSC 105t a ROUTING AREA UPDATE REQUEST message that comprises the same foreign TLLI as included in the 3GPP TS 44.018 GPRS SUSPEND REQUEST message on the SDCCH (see above).

Step 311

This step is seen in FIG. 3b. This step corresponds to step 205 in FIG. 2. The target BSC 105t requests the IMSI from the target SGSN 110t. The request comprises the foreign TLLI.

Step 312

This step is seen in FIG. 3b. This step corresponds to step 206 in FIG. 2. The target SGSN 110t replies back to the target BSC 105t with the IMSI value.

Step 313

This step is seen in FIG. 3b. This step corresponds to steps 207 and 208 in FIG. 2. The target BSC 105t uses the received IMSI from step 312 to find the device context, i.e. to find info indicating the serving operator using the IMSI. The target BSC 105t determines the target SGSN 110t (in case the target shared network 100t is a MOCN) served by serving operator or includes serving operator in the RAU request transmitted in step 314 to target SGSN 110t (in case the target shared network 100t is a GWCN).

Step 314

This step is seen in FIG. 3b. This step corresponds to step 209 in FIG. 2. The target BSC 105t forwards the RAU REQUEST message from step 310 to the SGSN served by the serving operator stored as selected serving operator in the device context. It includes the selected serving operator, e.g. PLMN, in the message if the target shared network 100t is a GWCN. FIG. 3b, illustrates that the target SGSN 110t is the target CN node that is served by the serving operator. In some embodiments, another target CN node (not shown) is the one that is served by the serving operator, and will receive the forwarded RAU REQUEST in step 314.

CS Handover with DTM

The method for source based PLMN selection, according to some embodiments will now be described with reference to the signaling diagram depicted in FIG. 4. This is the same scenario as in the "CS handover without DTM" as described above with reference to FIGS. 3a and 3b, except that DTM is used in the target cell/target shared network 100t in FIG. 4. In this example embodiment seen in FIG. 4, the source RAN node 105s is a source BSC, the target RAN node 105t is a target BSC. The source CN node 110t is a source MSC and the target CN node 110t is a target MSC. The target shared network 100t is exemplified with a GERAN in FIG. 4. The method comprises the following steps, which steps may be performed in any suitable order:

Step 401

This step corresponds to step 201 in FIG. 2 and step 301 in FIG. 3a. The source BSC 105s selects the serving operator, e.g. PLMN, for the target BSC 105t.

Step 402a, b, c

These steps correspond to steps 202a, b, c in FIG. 2 and steps 302a, b, c in FIG. 3a. The target BSC 105t in the target shared GERAN network 100t receives the selected serving operator in the handover preparation phase, e.g. in the HO REQUEST message in the target cell identifier. The target BSC 105t receives the selected serving operator from the source BSC 105s (step 402a) via the source MSC 110s (step 402b) and via the target MSC 110t (step 402c)

Step 403

This step corresponds to step 203 in FIG. 2 and step 303 in FIG. 3a. Triggered by the reception of the selected serving operator in steps 402a, b, c, the target BSC 105t stores the selected serving operator and the IMSI in the device context, e.g. the MS Context.

After the handover is completed the target BSC 105t provides the wireless device 101 with the System Information Type 6 which informs the wireless device 101 that the Routing Area is changed/different from the RA the wireless device 101 is registered in. This triggers the wireless device 101 to perform a Routing Area Update procedure. There are two alternative embodiments to perform RAU when DTM is used and the wireless device 101 is in dedicated mode (see 3GPP TS 43.055).

Alternative Embodiment 1

The wireless device 101 performs RAU on the Fast Associated Control Channel (FACCH). FACCH is a control channel associated with the Traffic CHannel (TCH) used for the dedicated mode.

Alternative Embodiment 2

Establish a PS connection in parallel to the CS connection. The wireless device 101 performs RAU using the PS connection while the CS connection exists in parallel.

In both alternative embodiments 1) and 2) above, the target BSC 105*t* is well aware that the RAU procedure is conducted and may associate it with the dedicated CS mode operation. Given that the wireless device 101 is in connected mode, the target BSC 105*t* may now simply use the previously stored selected serving operator and forward the RAU REQUEST message to the appropriate target CN node, e.g. PLMN, including information indicating the selected serving operator in the message.

After the CS call is terminated the wireless device 101 moves into idle mode, illustrated with the dotted line in FIG. 4, and acquires system information in the new cell. When it detects that the Location Area of the serving new cell is different from its registered Location Area, it will trigger the LAU procedure (see 3GPP TS 24.008).

Based on the above, the wireless device 101 accesses the network to perform the LAU procedure as described below in step 404-409:

Step 404

This step corresponds to step 304 in FIG. 3. The wireless device 101 accesses the network in the CS domain which results in assignment of an SDCCH (see 3GPP TS 44.018).

Step 405

This step corresponds to step 204 in FIG. 2, step 305 in FIG. 3*a* and step 310 in FIG. 3*b*. The wireless device 101 transmits a LAU request message to the target BSC 105*t*. The LAU message may comprise the TMSI.

Step 406

This step corresponds to step 205 in FIG. 2, step 306 in FIG. 3*a* and step 311 in FIG. 3*b*. Based on the fact that the LAU REQUEST message is related to a non-periodic LAU procedure, the target BSC 105*t* shall request the IMSI from the target MSC 110*t*. The target BSC 105*t* may provide the TMSI in the request for IMSI.

Step 407

This step corresponds to step 206 in FIG. 2, step 307 in FIG. 3*a* and step 312 in FIG. 3*b*. The target MSC 110*t* uses the TMSI to find the associated IMSI. The target MSC 110*t* replies back to the target BSC 105*t* with the IMSI value.

Step 408

This step corresponds to steps 207 and 208 in FIG. 2, step 308 in FIG. 3*a* and step 313 in FIG. 3*b*. The target BSC 105*t* uses the IMSI to find the device context, e.g. MS Context. The device context comprises information indicating the target CN node served by the serving operator which was stored in step 403.

Step 409

This step corresponds to step 209 in FIG. 2, step 309 in FIG. 3*a* and step 314 in FIG. 3*b*. The target BSC 105*t* forwards the LAU Request received in step 405 to the target CN node served by the serving operator stored in the device context in step 403. It includes the selected serving operator in the message if the target shared network 100*t* is a GWCN.

PS Handover

The method for source based PLMN selection, according to some embodiments will now be described with reference to the signaling diagram depicted in FIG. 5. It is assumed that DTM is not supported and that there is no support for the Gs interface and for the combined LAU/RAU procedure. Note that the embodiments herein in general are not limited to not use the Gs interface or to use combined LAU/RAU procedure. The wireless device 101 is registered to the CS and the PS domain. The wireless device 101 is in connected mode in the PS domain (i.e. it has an ongoing Temporary Block Flow (TBF)) and the wireless device 101 is subject to a PS handover into a shared GERAN cell. In this example embodiment seen in FIG. 5, the source RAN node 105*s* is a source BSC, the target RAN node 105*t* is a target BSC. The source CN node 110*s* is a source SGSN and the target CN node 110*t* is a target MSC. The method comprises the following steps, which steps may be performed in any suitable order:

Step 501

This step corresponds to step 201 in FIG. 2, step 301 in FIG. 3*a* and step 401 in FIG. 4. The source BSC 105*s* selects the serving operator for the target BSC 105*t* and includes the serving operator in the handover preparation phase, e.g. in the PS HANDOVER REQUIRED message in the target cell identifier.

Step 502*a, b, c*

This step corresponds to steps 202*a, b, c* in FIG. 2, steps 302*a, b, c* in FIG. 3*a* and steps 402*a, b, c* in FIG. 4. The target BSC 105*t* receives the selected serving operator in the handover preparation phase, e.g. in the PS HO REQUEST message in the target cell identifier. The target BSC 105*t* receives the selected operator from the source BSC 105*s* (step 502*a*) via the source SGSN 110*s* (step 502*b*) and via the target MSC 110*t* (step 502*c*).

Step 503

This step corresponds to step 203 in FIG. 2, step 303 in FIG. 3*a* and step 403 in FIG. 4. Triggered by the reception of a selected serving operator, the target BSC 105*t* stores the selected serving operator and the IMSI in the device context, e.g. MS context.

Based on the information regarding the RAI of the target cell received on the source side (see 3GPP TS 44.060), the wireless device 101 performs, after a successful PS handover conclusion, the RAU procedure as described in steps 504-505 below.

Step 504

This step corresponds to step 204 in FIG. 2, step 305 in FIG. 3*a*, step 310 in FIG. 3*b* and to step 405 in FIG. 4. The wireless device 101 sends a RAU REQUEST to the target BSC 105*t*.

Step 505

The target BSC 105*t* sends the RAU REQUEST message from step 504 to the target MSC 110*t* served by the serving operator, e.g. the PLMN associated with the serving operator, as stored in the device context as selected serving operator (i.e. the storing performed in step 503) and includes the selected serving operator and/or the foreign TLLI in the message. It is assumed that the selected serving operator is the same as the one serving the SGSN invoked in the PS handover procedure.

Step 506

This step corresponds to step 203 in FIG. 2, step 303 in FIG. 3a and step 403 in FIG. 4. The target BSC 105t stores the foreign TLLI to the device context. The foreign TLLI is the one that was received in step 504. Step 506 may be performed directly after step 504 or after step 505.

Once RAU is successfully performed the wireless device 101 drops the PS connection to perform the LAU as no combined procedures are used.

Subsequently the wireless device 101 will access the network to perform the LAU procedure as described below in steps 507-511:

The wireless device 101 may suspend the PS service and thus provides its local TLLI to the target BSC 105t in the 44.018 GPRS Suspend Request message on the SDCCH (CS domain). Based on the fact that the LAU REQUEST message is due to a non-periodic LAU procedure, the target BSC 105t may look for the device context using the local TLLI received in the 44.018 GPRS Suspend Request message. Hence in this case it may not be necessary to fetch the IMSI from a target CN node.

Step 507

This step corresponds to step 204 in FIG. 2, step 305 in FIG. 3a, step 310 in FIG. 3b and step 405 in FIG. 4. The wireless device 101 transmits a LAU Request message to the target BSC 105t.

Step 508

This step corresponds to step 205 in FIG. 2, step 306 in FIG. 3a, step 311 in FIG. 3b and step 406 in FIG. 4. The target BSC 105 sends a request for the IMSI to the target MSC 110t.

Step 509

This step corresponds to step 206 in FIG. 2, step 307 in FIG. 3a, step 312 in FIG. 3b and step 407 in FIG. 4. The target MSC 110t sends a response with the requested IMSI back to the target BSC 105t.

Step 510

This step corresponds to steps 207 and 208 in FIG. 2, step 308 in FIG. 3a, step 313 in FIG. 3 and step 408 in FIG. 4. The target BSC 105t uses the IMSI to find the device context. The device context comprises information indicating the target CN node served by the serving operator which was stored in step 403.

Step 511

This step corresponds to step 209 in FIG. 2, step 309 in FIG. 3a, step 314 in FIG. 3b and step 409 in FIG. 4. The target BSC 105t forwards the LAU REQUEST message from step 507 to the target CN node served by the serving operator stored as selected serving operator in the device context, which is the target MSC 110t in the example of FIG. 5.

Figure 6:
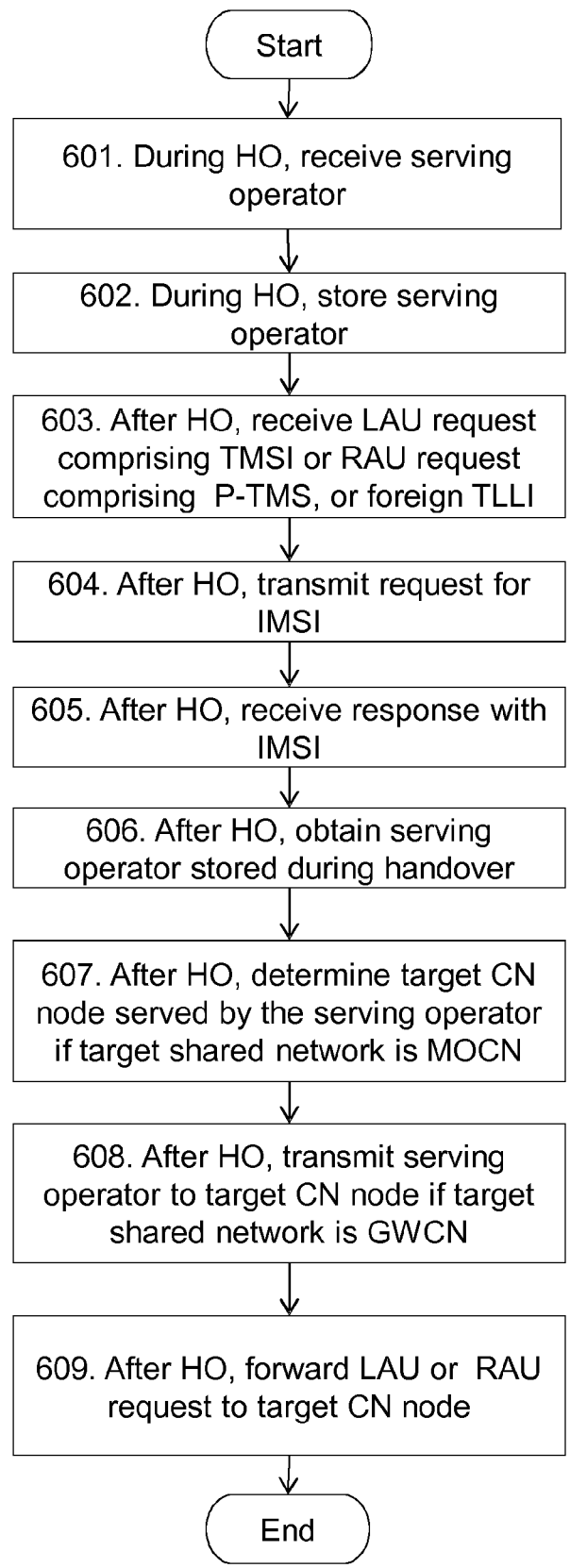
FIG. 6 is a flow chart illustrating embodiments of a method in a target RAN node.

The method described above will now be described seen from the perspective of the target RAN node 105t. FIG. 6 is a flowchart describing the present method in the target RAN node 105t for enabling source based selection of the serving operator which should serve the wireless device 101 in the target shared network 100t. The source network 100s may be based on GERAN, UTRAN or E-UTRAN. The target shared network 100t may be based on GERAN or UTRAN. The target shared network 100t may be a GWCN or a MOCN. The wireless device 101 may be a non-supporting wireless device. The handover may be a PS handover or a CS handover. The target RAN node 105t may be a NodeB, base station, BSC or RNC. The method comprises the following steps to be performed by the target RAN node 105t:

Step 601

This step corresponds to steps 202a, 202b and 202c in FIG. 2, steps 302a, 302b and 302c in FIG. 3a, steps 402a, 402b and 402c and steps 502a, 502b and 502c in FIG. 5. During handover of the wireless device 101 from the source network 100s to the target shared network 100t, the target RAN node 105t receives, from a source RAN node 105s, information indicating the serving operator that should serve the wireless device 101 in the target shared network 100t. The serving operator is selected by the source RAN node 105s. The information is the PLMN and the IMSI associated with the wireless device 101.

Step 602

This step corresponds to step 203 in FIG. 2, step 303 in FIG. 3a, step 403 in FIG. 4 and steps 503 and 506 in FIG. 5. During the handover, the target RAN node 105t stores the information indicating the serving operator.

Step 603

This step corresponds to step 204 in FIG. 2, step 305 in FIG. 3a, step 310 in FIG. 3b, step 405 in FIG. 4 and steps 504 and 507 in FIG. 5. In some embodiments, after the handover, the target RAN node 105t receives, from the wireless device 101, a LAU request comprising a TMSI or a RAU request comprising a P-TMSI or a foreign TLLI.

Step 604

This step corresponds to step 205 in FIG. 2, step 306 in FIG. 3a, step 311 in FIG. 3b, step 406 in FIG. 4 and step 508 in FIG. 5. After the handover, the target RAN node 105t transmits a request for the IMSI to the target CN node 110t. The transmitted request for the IMSI may comprise the TMSI, the P-TMSI or the foreign TLLI.

Step 605

This step corresponds to step 206 in FIG. 2, step 307 in FIG. 3a, step 312 in FIG. 3b, step 407 in FIG. 4 and step 509 in FIG. 5. After the handover, the target RAN node 105t receives a response with information indicating the IMSI from the target CN node 110t.

Step 606

This step corresponds to step 207 in FIG. 2, step 308 in FIG. 3a, step 313 in FIG. 3b, step 408 in FIG. 4 and step 510 in FIG. 5. After the handover, the target RAN node 105t obtains information about the serving operator stored during the handover. The information may be obtained using the IMSI received after the handover. The information indicating the serving operator that is received during handover may be received via the source CN node 110s and the target CN node 110t.

Step 606a

This step is a substep of step 606 and is a step performed as an alternative to step 606b. This step corresponds to step 207 in FIG. 3, step 308 in FIG. 3a, step 313 in FIG. 3b, step 408 in FIG. 4 and step 510 in FIG. 5. In some embodiments, the obtaining of the information about the serving operator is performed by comparing the IMSI received in the response from the target CN node 110*t* with the IMSI stored during the handover.

Step 606*b*

This step is a substep of step 606 and is a step performed as an alternative to of step 606*a*. This step corresponds to step 207 in FIG. 3, step 308 in FIG. 3*a*, step 313 in FIG. 3*b*, step 408 in FIG. 4 and step 510 in FIG. 5. In some embodiments, the obtaining of the information about the serving operator is performed by using a local TLLI.

Step 607

This step corresponds to step 208 in FIG. 2, step 308 in FIG. 3*a*, step 313 in FIG. 3*b*, step 408 in FIG. 4 and step 510 in FIG. 5. After the handover, the target RAN node 105*t* determines a target CN node 110*t* served by the serving operator if the target shared network 100*t* is a MOCN network.

Step 608

This step corresponds to step 209 in FIG. 2, step 309 in FIG. 3*a*, step 314 in FIG. 3*b*, step 409 in FIG. 4 and step 511 in FIG. 5. After the handover, the target RAN node 105*t* transmits information indicating the serving operator to the target CN node 110*t* if the target shared network 100*t* is a GWCN network. The serving operator was selected by the source RAN node 105*s* during the handover.

Step 609

This step corresponds to step 209 in FIG. 2, step 309 in FIG. 3*a*, step 314 in FIG. 3*b*, step 409 in FIG. 4 and step 511 in FIG. 5. In some embodiments, after the handover, the target RAN node 105*t* forwards a LAU request or a RAU request to a target CN node 110*t*. The target CN node 110*t* is the determined target CN node 110*t* or a target CN node 110*t* shared by all CN operators. The LAU request or RAU request is received from the wireless device 101. In some embodiments, the target CN node 110*t* is shared by all CN operators in a GWCN. The information indicating the serving operator is transmitted together with the LAU request or the RAU request if the target shared network 100*t* is a GWCN network.

Figure 7:
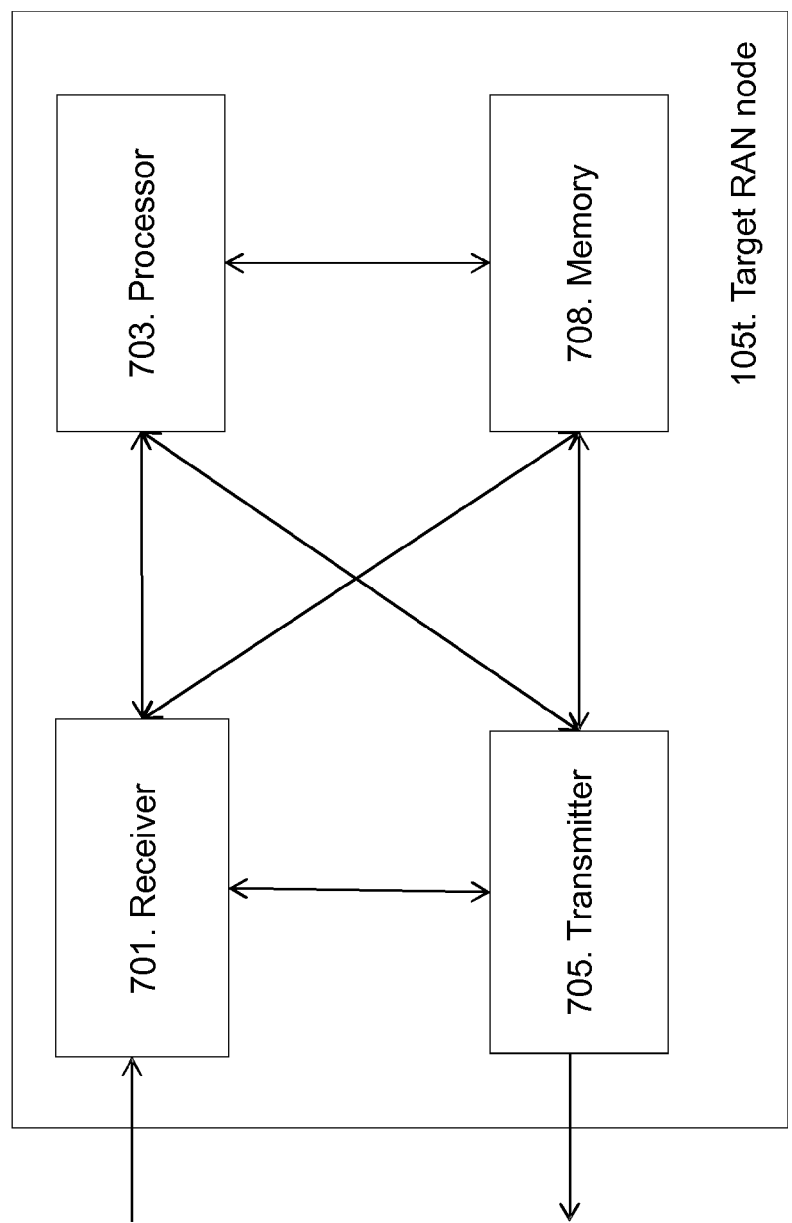
FIG. 7 is a schematic block diagram illustrating embodiments of a target RAN node.

To perform the method steps seen in FIGS. 2, 3*a*, 3*b*, 4, 5 and 6, the target RAN node 105*t* comprises an arrangement as shown in FIG. 7. The target RAN node 105*t* is adapted to enable source based selection of the serving operator which should serve the wireless device 101 in the target shared network 100*t*. The source network 100*s* may be based on GERAN, UTRAN or E-UTRAN. The target shared network 100*t* may be based on GERAN or UTRAN. The target shared network 100*t* may be a GWCN or a MOCN. The wireless device 101 may be a non-supporting wireless device. The handover may be a PS handover or a CS handover. The target RAN node 105*t* may be a NodeB, base station, BSC or RNC.

The target RAN node 105*t* comprises a receiver 701. The receiver 701 is adapted to, during handover of the wireless device 101 from the source network 100*s* to the target shared network 100*t*, receive, from the source RAN node 105*s*, information indicating the serving operator that should serve the wireless device 101 in the target shared network 100*t*. The serving operator is selected by the source RAN node 105*s*. The information is the PLMN and the IMSI associated with the wireless device 101. The information indicating the serving operator that is received during handover may be received via a source CN node 110*s* and target CN node 110*t*. The receiver 701 is further adapted to, after the handover, receive a response with information indicating the IMSI from the target CN node 110*t*. The receiver 701 may be further adapted to, after the handover, receive, from the wireless device 101, a LAU request comprising a TMSI or a RAU request comprising a P-TMSI or a foreign TLLI.

The target RAN node 105*t* comprises a processor 703 which is adapted to, during the handover, store the information indicating the serving operator. The processor 703 is further adapted to after the handover, obtain information about the serving operator stored during the handover. The information is obtained using the IMSI received after the handover. The processor 703 is adapted to, after the handover, determine the target CN node 110*t* served by the serving operator if the target shared network 100*t* is a MOCN network. The processor 703 may be is further adapted to obtain the information about the serving operator by comparing the IMSI received in the response from the target CN node 110*t* with the IMSI stored during the handover, or by using a local TLLI.

The target RAN node 105*t* comprises a transmitter 705. The transmitter 705 is adapted to, after the handover, transmit a request for the IMSI to a target CN node 110*t*. The transmitter 705 is further adapted to, after the handover, transmit information indicating the serving operator to the target CN node 110*t* if the target shared network 100*t* is a GWCN network. The serving operator was selected by the source RAN node 105*s* during the handover. The transmitted request for the IMSI may comprise the TMSI, the P-TMSI or the foreign TLLI. The transmitter 705 may be further adapted to, after the handover, forward a LAU request or a RAU request to the target CN node 110*t*. The target CN node 110*t* is the determined target CN node 110*t* or a target CN node 110*t* shared by all CN operators. The LAU request or RAU request is received from the wireless device 101. In some embodiments, the target CN node 110*t* is shared by all CN operators in a GWCN.

The information indicating the serving operator may be transmitted together with the LAU request or the RAU request if the target shared network 100*t* is a GWCN network.

The target RAN node 105*t* may further comprise a memory 708 comprising one or more memory units. The memory 708 is arranged to be used to store data, received data streams, power level measurements, information indicating the serving operator, IMSI, PLMN, LAU, RAU threshold values, time periods, configurations, schedulings, and applications to perform the methods herein when being executed in the target RAN node 105*t*.

Those skilled in the art will also appreciate that the receiver 701 and the transmitter 705 described above may refer to a combination of analog and digital circuits, and/or one or more processors configured with software and/or firmware, e.g. stored in a memory, that when executed by the one or more processors such as the processor 703.

Figure 8:
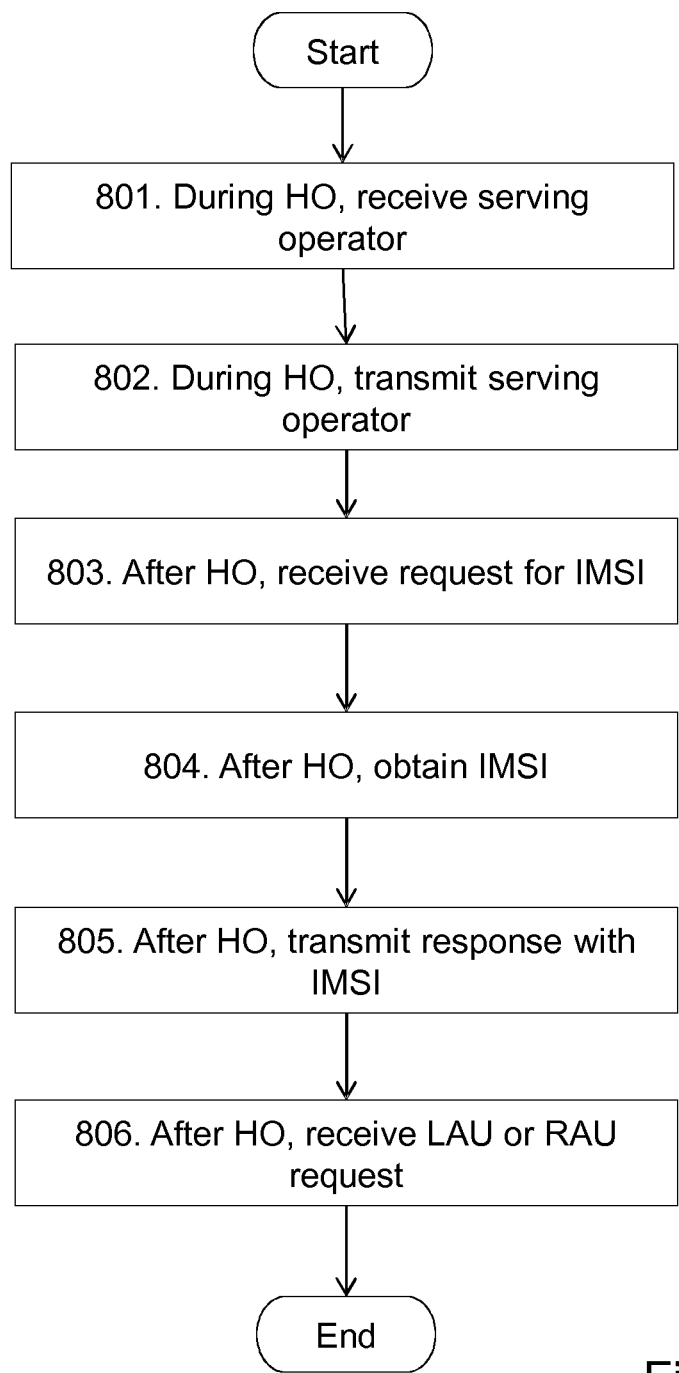
FIG. 8 is a flow chart illustrating embodiments of a method in a target CN node.

The method described above will now be described seen from the perspective of the target CN node 110*t*. FIG. 8 is a flowchart describing the present method in the target CN node 110*t* for enabling source based selection of the serving operator which should serve the wireless device 101 in the target shared network 100*t*. In some embodiments, the target CN node 110*t* is served by the serving operator when the target shared network 100*t* is a MOCN, and the serving operator was selected by the source RAN node 105*s* during the handover. In some embodiments, the target CN node 110*t* is shared by all CN operators when the target shared network 100*t* is a GWCN. The information indicating the serving operator may be received together with the LAU request or the RAU request when the target shared network 100*t* is a GWCN network. The source network 100*s* may be based on GERAN, UTRAN or E-UTRAN. The target shared network 100*t* may be based on GERAN or UTRAN. The target shared network 100*t* may be a GWCN or a MOCN. The wireless device 101 is a non-supporting wireless device. The handover may be a PS handover or a CS handover. The target CN node 110*t* may be a MSC or a SGSN. The method comprises the following steps to be performed by the target CN node 110*t*, which steps may be performed in any suitable order than described below:

Step 801

This step corresponds to step 202*b* in FIG. 2, step 302*b* in FIG. 3*a*, step 402*b* in FIG. 4 and step 502*b* in FIG. 5. In some embodiments, during the handover, the target CN node 110*t* receives, from a source CN node 110*s*, information indicating the serving operator that should serve the wireless device 101 in the target shared network 100*t*. The serving operator may be selected by the source RAN node 105*s*. The information may be the PLMN and the IMSI, associated with the wireless device 101.

Step 802

This step corresponds to step 202*c* in FIG. 2, step 302*c* in FIG. 3*a*, step 402*c* in FIG. 4 and step 502*c* in FIG. 5. In some embodiments, during the handover, the target CN node 110*t* transmits the information indicating the serving operator to the target RAN node 105*t*.

Step 803

This step corresponds to step 205 in FIG. 2, step 306 in FIG. 3*a*, step 311 in FIG. 3*b*, step 406 in FIG. 4 and step 508 in FIG. 5. After handover of the wireless device 101 from the source network 100*s* to the target shared network 100*t*, the target CN node 110*t* receives a request for the IMSI from the target RAN node 105*t*. The request for the IMSI may comprise a TMSI, a P-TMSI or a foreign TLLI.

Step 804

This step corresponds to steps 205 and 206 in FIG. 2, steps 306 and 307 in FIG. 3*a*, steps 311 and 312 in FIG. 3*b*, steps 406 and 407 in FIG. 4 and steps 508 and 509 in FIG. 5. In some embodiments, the target CN node 110*t* obtains the IMSI using the TMSI, P-TMSI or foreign TLLI.

Step 805

This step corresponds to step 206 in FIG. 2, step 307 in FIG. 3*a*, step 312 in FIG. 3*b*, step 407 in FIG. 4 and step 509 in FIG. 5. After the handover, the target CN node 110*t* transmits a response with information indicating the IMSI to the target RAN node 105*t*.

Step 806

This step corresponds to step 209 in FIG. 2, step 309 in FIG. 3*a*, step 314 in FIG. 3*b*, step 409 in FIG. 4 and step 511 in FIG. 5. In some embodiments, after the handover, the target CN node 110*t* receives a LAU request or a RAU request from the target RAN node 105*t*.

Figure 9:
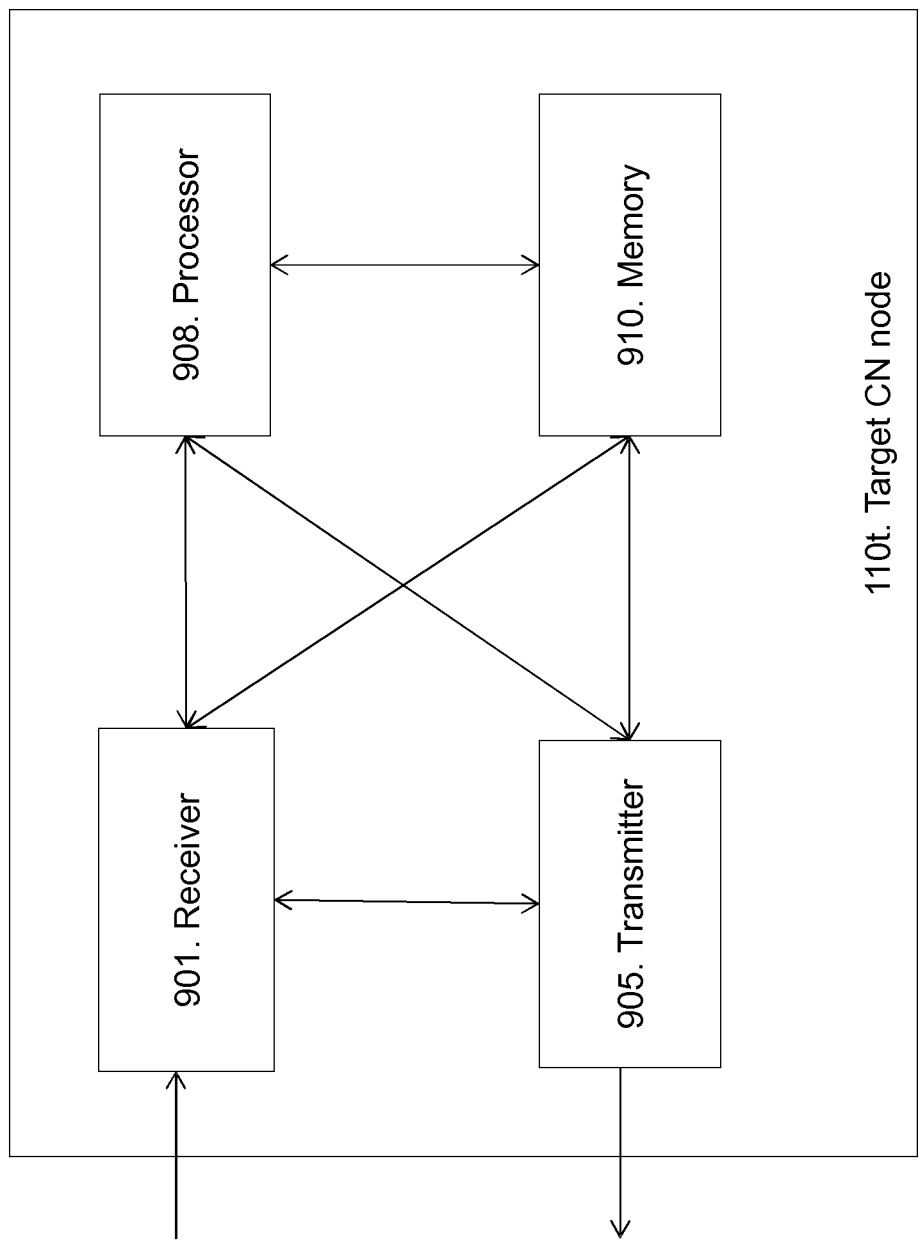
FIG. 9 is a schematic block diagram illustrating embodiments of a target CN node.

To perform the method steps in FIGS. 2, 3*a*, 3*b*, 4, 5 and 8, the target CN node 110*t* comprises an arrangement as shown in FIG. 9. The target CN node 110*t* is adapted to enable source based selection of the serving operator which should serve the wireless device 101 in the target shared network 100*t*. In some embodiments, the target CN node 110*t* is served by the serving operator when the target shared network 100*t* is a MOCN, and the serving operator was selected by the source RAN node 105*s* during the handover. In some embodiments, the target CN node 110*t* is shared by all CN operators when the target shared network 100*t* is a GWCN, and the information indicating the serving operator is received together with the LAU request or the RAU request when the target shared network 100*t* is a GWCN network. The source network 100*s* may be based on GERAN, UTRAN or E-UTRAN. The target shared network 100*t* may be based on GERAN or UTRAN. The target shared network 100*t* may be a GWCN or a MOCN. The wireless device 101 may be a non-supporting wireless device. The handover may be a PS handover or a CS handover. The target CN node 110*t* may be a MSC or a SGSN.

The target CN node 110*t* comprises a receiver 901. The receiver 901 is adapted to, after handover of the wireless device 101 from the source network 100*s* to the target shared network 100*t*, receive a request for the IMSI from the target RAN node 105*t*. The request for the IMSI may comprise a TMSI, a P-TMSI or a foreign TLLI. The receiver 901 may be further adapted to, after the handover, receive a LAU request or a RAU request from the target RAN node 105*t*. The receiver 901 may be further adapted to, during the handover, receive, from the source CN node 110*s*, information indicating the serving operator that should serve the wireless device 101 in the target shared network 100*t*. The serving operator may be selected by the source RAN node 105*s*. The information is the PLMN and the IMSI associated with the wireless device 101.

The target CN node 110*t* comprises a transmitter 905. The transmitter 905 is adapted to, after the handover, transmit a response with information indicating the IMSI to the target RAN node 105*t*. The transmitter 905 may be further adapted to, during the handover, transmit the information indicating the serving operator to the target RAN node 105*t*.

The target CN node 110*t* may comprise a processor 908 which is adapted to, after the handover, obtain the IMSI using the TMSI, P-TMSI or foreign TLLI.

The target CN node 110*t* may further comprise a memory 910 comprising one or more memory units. The memory 908 is arranged to be used to store data, received data streams, power level measurements, information indicating the serving operator, IMSI, PLMN, LAU, RAU threshold values, time periods, configurations, schedulings, and applications to perform the methods herein when being executed in the target CN node 110*t*.

Those skilled in the art will also appreciate that the receiver 901 and the transmitter 905 described above may refer to a combination of analog and digital circuits, and/or one or more processors configured with software and/or firmware, e.g. stored in a memory, that when executed by the one or more processors such as the processor 908.

Figure 10:
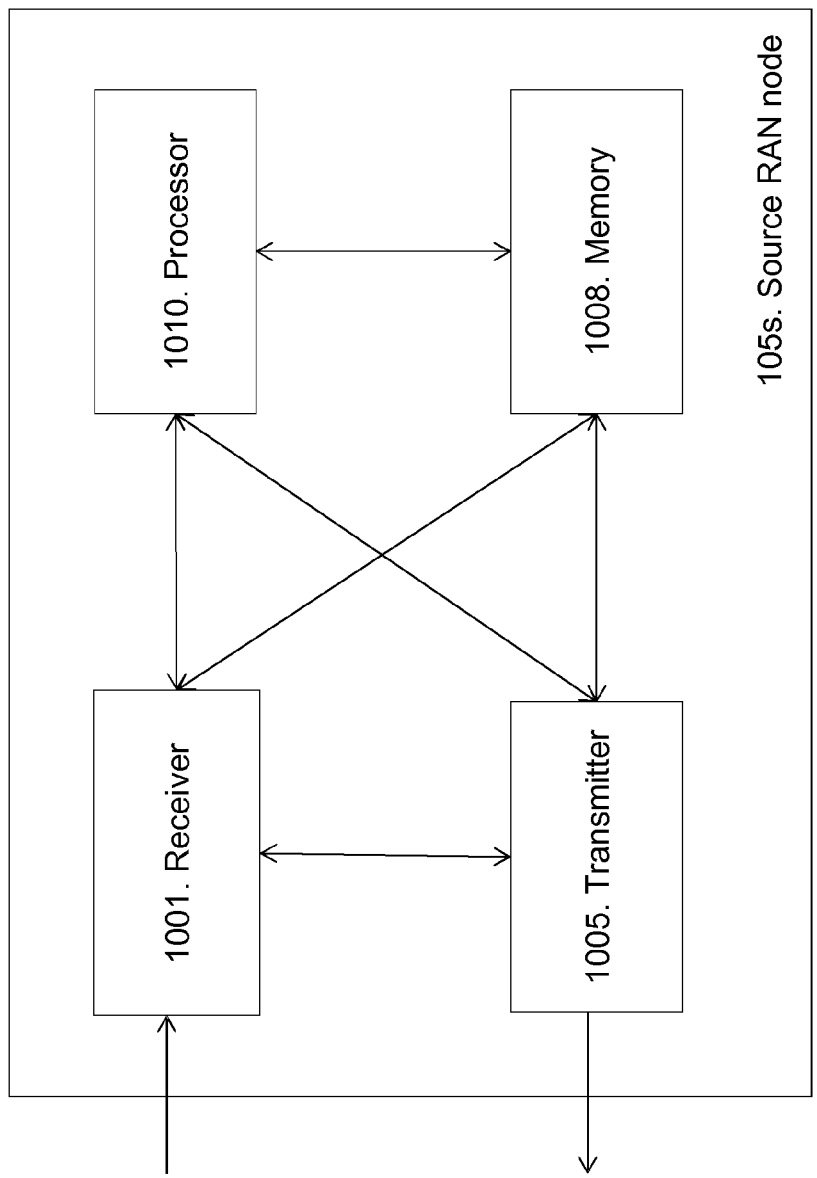
FIG. 10 is a schematic block diagram illustrating embodiments of a source RAN node.

To perform the method steps in FIGS. 2, 3a, 3b, 4 and 5, the source RAN node 105s comprises an arrangement as shown in FIG. 10. The source RAN node 105s comprises a receiver 1001 adapted to receive data, signalling, from nodes in the network. The source RAN node 105s comprises a transmitter 1005 which is adapted to transmit information indicating a selected serving operator to a source CN node 110s. The source RAN node 105s may further comprise a memory 1008 comprising one or more memory units. The memory 1008 is arranged to be used to store data, received data streams, power level measurements, information indicating the serving operator, threshold values, time periods, configurations, schedulings, and applications to perform the methods herein when being executed in the source RAN node 105s. The source RAN node 105s may comprise a processor 1010 adapted to select a serving operator for the target shared network 100t. Those skilled in the art will also appreciate that the receiver 1001 and the transmitter 1005 described above may refer to a combination of analog and digital circuits, and/or one or more processors configured with software and/or firmware, e.g. stored in a memory, that when executed by the one or more processors such as the processor 1010.

The embodiments herein may be implemented through one or more processors, such as the processor 703 in the target RAN node 105t depicted in FIG. 7, a processor 908 in the target CN node 110t depicted in FIG. 9, a processor 1010 in the source RAN node 105s depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the source RAN node 105s and/or target RAN node 105t and/or target CN node 110t. One such carrier may be in the form of a CD ROM disc. It is however feasible with other data carriers such as a memory stick. The computer program code can furthermore be provided as pure program code on a server and downloaded to the source RAN node 105s and/or target RAN node 105t and/or target CN node 110t.

Some example implementations of the embodiments illustrated above will now be described.

The described embodiments may be implemented in any appropriate type of communication system supporting any suitable communication standards and using any suitable components, particular embodiments of the described solutions may be implemented in a network, such as that illustrated in FIG. 1.

The example network may further include any additional elements suitable to support communication between wireless devices 101 or between a wireless device 101 and another communication device, such as a landline telephone. Although the illustrated wireless device 101 may represent a communication device that includes any suitable combination of hardware and/or software, this wireless device 101 may, in particular embodiments, represent a device such as the example wireless device 101 illustrated in greater detail by FIG. 11. Similarly, although the illustrated network nodes may represent network nodes that includes any suitable combination of hardware and/or software, these network nodes may, in particular embodiments, represent devices such as the example network node 1200 illustrated in greater detail by FIG. 12.

Figure 11:
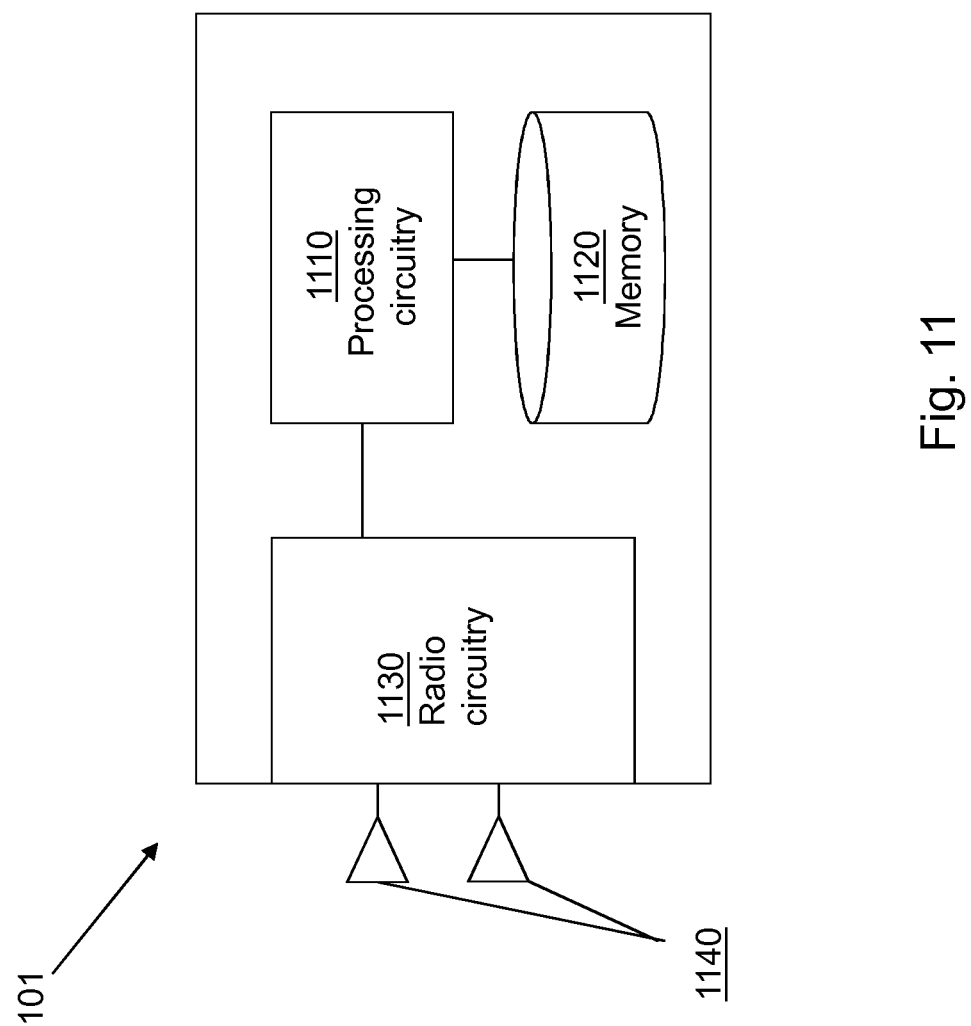
FIG. 11 is a schematic block diagram illustrating embodiments of a wireless device.

As shown in FIG. 11, the example wireless device 101 includes processing circuitry 1110, a memory 1120, radio circuitry 1130, and at least one antenna 1140. The radio circuitry may comprise RF circuitry and baseband processing circuitry (not shown). In particular embodiments, some or all of the functionality described above as being provided by mobile communication devices or other forms of wireless device may be provided by the processing circuitry 1110 executing instructions stored on a computer-readable medium, such as the memory 1120 shown in FIG. 11. Alternative embodiments of the wireless device 101 may include additional components beyond those shown in FIG. 11 that may be responsible for providing certain aspects of the wireless device's functionality, including any of the functionality described above and/or any functionality necessary to support the solution described above.

Figure 12:
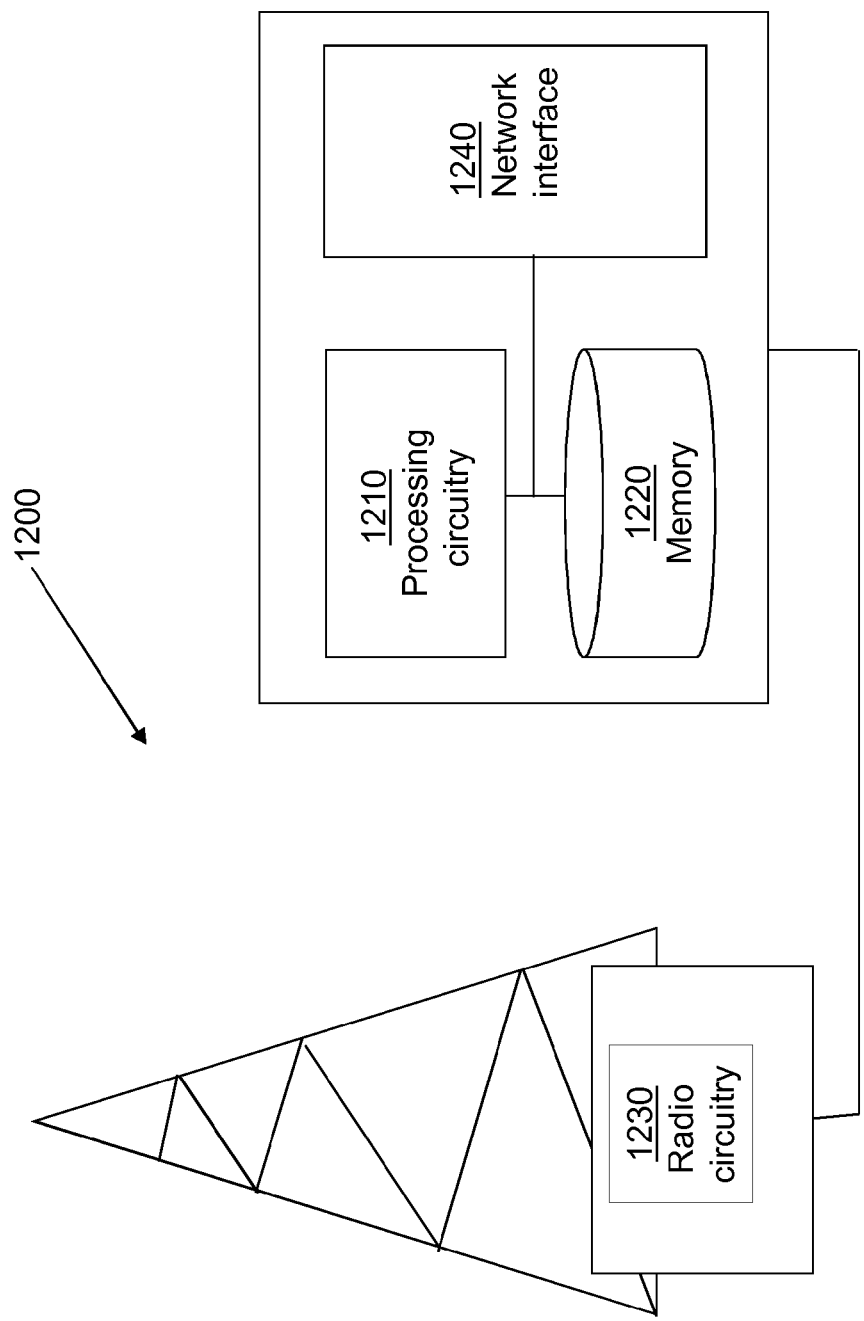
FIG. 12 is a schematic block diagram illustrating embodiments of a network node.

As shown in FIG. 12, the example network node 1200 includes processing circuitry 1210, a memory 1220, radio circuitry 1230, network interface 1240 and at least one antenna (not shown). The processing circuitry 1210 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 1210 executing instructions stored on a computer-readable medium, such as the memory 1220 shown in FIG. 12. Alternative embodiments of the network node 1200 may include additional components responsible for providing additional functionality, including any of the functionality identified above and/or any functionality necessary to support the solution described above.

Some embodiments described herein may be summarised in the following manner:

A method performed in the source RAN node (BSC) 105s may comprise the following steps, which steps may be performed in any suitable order:

During handover of the wireless device 101 from the source network 100s to the target shared network 100t:
        Selecting a serving operator serving the wireless device 101 in the target shared network 100t.
        Transmitting information indicating the serving operator to a target RAN node 105t.
            The information may be transmitted via the source CN node 110s and the target CN node 110t.
            The information may be comprised in HANDOVER REQUIRED or PS HANDOVER REQUIRED messages.
            The information may be a part of the target cell identifier or an information element.

A method performed in a target CN node (MSC or SGSN) 110t may comprise the following steps, which steps may be performed in any suitable order:

During handover of the wireless device 101 from the source network 100s to the target shared network 100t:
Receiving information indicating serving operator from the source RAN node 105s via the source CN node 100s.
Transmitting information indicating serving operator to the target RAN node 105t.

After handover:
Receiving request for IMSI from the target RAN node 105t, request comprises information indicating PTMSI or TMSI or other suitable parameter.
Obtaining IMSI using PTMSI.
Transmitting a response to the target RAN node 105t comprising information indicating the IMSI.
Receiving forwarded LAU or RAU.

A method performed in a target RAN node (BSC) 105t may comprise the following steps, which steps may be performed in any suitable order:

During handover of wireless device 101 from the source network 100s to the target shared network 100t:
Receiving information indicating the serving operator, e.g. PLMN, and IMSI from the source RAN node 105s.
Information may be received via the source CN node 110s and the target CN node 110t.
Storing information indicating serving operator and IMSI
Information may be stored in device context.
Information may be stored in memory.

After handover:
Receiving LAU or RAU from wireless device 101.
LAU may comprise TMSI.
RAU may comprise P-TMSI.
RAU may comprise foreign TLLI.
Storing information indicating local TLLI.
Transmitting request for IMSI to the target CN node 110t.
Request may comprise TMSI or P-TMSI or any other suitable parameter.
Receiving response with information indicating IMSI from the target CN node 110t.
Obtain device context, e.g. MS context.
Obtaining information about the serving operator:
by comparing the IMSI received in the response with the IMSI previously stored during handover, or
by using local TLLI
Determining target CN node (MOCN) 110t served by serving operator or transmitting information indicating serving operator to target CN node 110t (GWCN).
Forwarding received LAU or RAU to target CN node 110t.

The source network 100s may be based on GERAN, UTRAN or E-UTRAN.

The target shared network 100t may be based on GERAN or UTRAN.

The target shared network 100t may be a GWCN or MOCN network.

The wireless device 101 may be a non-supporting wireless device.

The handover is a PS handover or a CS handover.

The serving operator may be identified with an operator ID or a PLMN ID.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined herein, without departing from the embodiments herein, be performed in another order than the order in which they appear.

The invention claimed is:

1. A method in a target Radio Access Network, RAN, node for enabling source based selection of a serving operator which should serve a wireless device in a target shared network, the method comprising:

during handover of the wireless device from a source network to the target shared network, receiving, from a source RAN node, information indicating the serving operator that should serve the wireless device in the target shared network, the serving operator being selected by the source RAN node, and the information being a Public Land Mobile Network, PLMN, and an International Mobile Subscriber Identity, IMSI, associated with the wireless device;

during the handover, storing the information indicating the serving operator;

after the handover, transmitting a request for the IMSI to a target Core Network, CN, node, after the handover, receiving a response with information indicating the IMSI from the target CN node;

after the handover, obtaining information about the serving operator stored during the handover, the information being obtained using the IMSI received after the handover;

after the handover, determining a target CN node served by the serving operator if the target shared network is a Multi Operator Core Network, MOCN, network; and after the handover, transmitting information indicating the serving operator to the target CN node if the target shared network is a GateWay Core Network, GWCN, network, the serving operator having been selected by the source RAN node during the handover.

2. The method according to claim 1, further comprising:
after the handover, forwarding one of a Location Area Update, LAU, request and a Routing Area Update, RAU, request to a target CN node, wherein the target CN node is one of the determined target CN node and a target CN node shared by all CN operators, and wherein the one of the LAU request and RAU request is received from the wireless device.

3. The method according to claim 2, wherein the target CN node is shared by all CN operators in a GWCN, and wherein information indicating the serving operator is transmitted together with the one of LAU request and the RAU request if the target shared network is a GWCN.

4. The method of claim 1, further comprising:
after the handover, receiving, from the wireless device one of, a Location Area Update, LAU, request comprising a Temporary Mobile Subscriber Identity, TMSI, a Routing Area Update, RAU, request comprising a Packet Temporary Mobile Subscriber Identity, P-TMSI, and a foreign Temporary Logical Link Identifier, TLLI; and
wherein the transmitted request for the IMSI comprises the one of TMSI, the P-TMSI and the foreign TLLI.

5. The method of claim 1, wherein the obtaining information about the serving operator further comprises one of:
comparing the IMSI received in the response from the target CN node with the IMSI stored during the handover; and
obtaining information about the serving operator by using a local Temporary Logical Link Identifier, TLLI.

6. The method of claim 1, wherein the information indicating the serving operator that is received during handover is received via a source CN node and target CN node.

7. The method of claim 1, wherein the source network is based on one of Global system for mobile communications Enhanced data rates for global evolution Radio Access Network, GERAN, Universal Terrestrial Radio Access Network, UTRAN, and Evolved-Universal Terrestrial Radio Access Network, E-UTRAN; and
wherein the target shared network is based on one of GERAN and UTRAN.

8. The method of claim 1, wherein the target shared network is one of a GateWay Core Network, GWCN, and a Multi Operator Core Network, MOCN.

9. The method of claim 1, wherein the wireless device is a non-supporting wireless device.

10. The method of claim 1, wherein the handover is one of a Packet Switched, PS, handover and a Circuit Switched, CS, handover.

11. The method of claim 1, wherein the target RAN node is one of a NodeB, base station, Base Station Controller, BSC, and a Radio Network Controller, RNC.

12. A target Radio Access Network, RAN, node for enabling source based selection of a serving operator which should serve a wireless device in a target shared network, the target RAN node comprising:
a receiver configured to, during handover of the wireless device from a source network to the target shared network, receive, from a source RAN node, information indicating the serving operator that should serve the wireless device in the target shared network, the serving operator being selected by the source RAN node, and the information being a Public Land Mobile Network, PLMN, and an International Mobile Subscriber Identity, IMSI, associated with the wireless device;

a processor configured to, during the handover, store the information indicating the serving operator;
a transmitter configured to, after the handover, transmit a request for the IMSI to a target Core Network, CN, node;
the receiver being further configured to:
after the handover, receive a response with information indicating the IMSI from the target CN node;
the processor being further configured to:
after the handover, obtain information about the serving operator stored during the handover, the information being obtained using the IMSI received after the handover;
after the handover, determine a target CN node served by the serving operator if the target shared network is a Multi Operator Core Network, MOCN; and
the transmitter being further configured to:
after the handover, transmit information indicating the serving operator to the target CN node if the target shared network is a GateWay Core Network, GWCN, wherein the serving operator was selected by the source RAN node during the handover.

13. The target RAN node according to claim 12, wherein the transmitter is further configured to:
after the handover, forward one of a Location Area Update, LAU, request and a Routing Area Update, RAU, request to a target CN node, wherein the target CN node is one of the determined target CN node and a target CN node shared by all CN operators, and wherein the one of LAU request and RAU request is received from the wireless device.

14. The target RAN node according to claim 13, wherein the target CN node is shared by all CN operators in a GWCN, and wherein information indicating the serving operator is transmitted together with the one of the LAU request and the RAU request if the target shared network is a GWCN.

15. The target RAN node of claim 12, wherein the receiver is further configured to:
after the handover, receive, from the wireless device, a Location Area Update, LAU, request comprising one of a Temporary Mobile Subscriber Identity, TMSI, and a Routing Area Update, RAU, request comprising one of a Packet Temporary Mobile Subscriber Identity, P-TMSI, and a foreign Temporary Logical Link Identifier, TLLI; and
wherein the transmitted request for the IMSI comprises the one of the TMSI, the P-TMSI and the foreign TLLI.

16. The target RAN node of claim 12, wherein the processor is further configured to obtain the information about the serving operator by one of:
comparing the IMSI received in the response from the target CN node with the IMSI stored during the handover; and
obtaining information about the serving operator by using a local Temporary Logical Link Identifier, TLLI.

17. The target RAN node of claim 12, wherein the information indicating the serving operator that is received during handover is received via a source CN node and the target CN node.

18. The target RAN node of claim 12, wherein the source network is based on one of Global system for mobile communications Enhanced data rates for global evolution Radio Access Network, GERAN, Universal Terrestrial Radio Access Network, UTRAN, and Evolved-Universal Terrestrial Radio Access Network, E-UTRAN; and
   wherein the target shared network is based on one of GERAN and UTRAN.

19. The target RAN node of claim 12, wherein the target shared network is one of a GateWay Core Network, GWCN, and a Multi Operator Core Network, MOCN.

20. The target RAN node of claim 12, wherein the wireless device is a non-supporting wireless device.

21. The target RAN node of claim 12, wherein the handover is one of a Packet Switched, PS, handover and a Circuit Switched, CS, handover.

22. The target RAN node of claim 12, wherein the target RAN node is one of a NodeB, base station, Base Station Controller, BSC, and Radio Network Controller, RNC.

* * * * *